US011961454B2

(12) United States Patent
Pyo et al.

(10) Patent No.: US 11,961,454 B2
(45) Date of Patent: Apr. 16, 2024

(54) DISPLAY DEVICE AND DRIVING METHOD THEREOF

(71) Applicant: SAMSUNG DISPLAY CO., LTD., Yongin-si (KR)

(72) Inventors: Si Beak Pyo, Yongin-si (KR); Seung Kyu Lee, Yongin-si (KR); Young Uk Hwang, Yongin-si (KR)

(73) Assignee: Samsung Display Co., Ltd., Yongin-si (KR)

( * ) Notice: Subject to any disclaimer, the term of this patent is extended or adjusted under 35 U.S.C. 154(b) by 0 days.

(21) Appl. No.: 18/055,249

(22) Filed: Nov. 14, 2022

(65) Prior Publication Data

US 2023/0076579 A1 Mar. 9, 2023

Related U.S. Application Data

(63) Continuation of application No. 17/248,443, filed on Jan. 25, 2021, now Pat. No. 11,501,694.

(30) Foreign Application Priority Data

Feb. 12, 2020 (KR) ........................ 10-2020-0017200
Sep. 15, 2020 (KR) ........................ 10-2020-0118662

(51) Int. Cl.
*G09G 3/32* (2016.01)

(52) U.S. Cl.
CPC ......... *G09G 3/32* (2013.01); *G09G 2310/027* (2013.01); *G09G 2320/0233* (2013.01); *G09G 2320/0285* (2013.01); *G09G 2360/16* (2013.01)

(58) Field of Classification Search
CPC ............... G09G 3/32; G09G 2310/027; G09G 2320/0233; G09G 2320/0285; G09G 2360/16; G09G 2320/0223; G09G 2320/0626; G09G 2320/0653; G09G 3/3233; G09G 3/20; G09G 2330/021
See application file for complete search history.

(56) References Cited

U.S. PATENT DOCUMENTS

| | | | |
|---|---|---|---|
| 9,013,519 | B2 | 4/2015 | Park et al. |
| 9,514,709 | B2 | 12/2016 | Pyo |
| 9,607,552 | B2 | 3/2017 | Lim |
| 9,761,169 | B2 | 9/2017 | Park et al. |
| 9,953,573 | B2 | 4/2018 | Pyo et al. |
| 10,089,959 | B2 | 10/2018 | Jangda et al. |
| 10,121,417 | B2 | 11/2018 | Park et al. |

(Continued)

FOREIGN PATENT DOCUMENTS

| | | | |
|---|---|---|---|
| KR | 10-1131316 | B1 | 4/2012 |
| KR | 10-2015-0139014 | A | 12/2015 |

(Continued)

*Primary Examiner* — Jose R Soto Lopez
(74) *Attorney, Agent, or Firm* — Lewis Roca Rothgerber Christie LLP

(57) ABSTRACT

A display device includes: a plurality of pixels to receive data voltages based on converted grayscales; and a grayscale converter to: calculate first compensation offsets based on positions of the pixels and input grayscales for the pixels; convert the first compensation offsets into second compensation offsets according to a maximum luminance weight based on an input maximum luminance; and calculate the converted grayscales by applying the second compensation offsets to the input grayscales.

15 Claims, 19 Drawing Sheets

(56) References Cited

U.S. PATENT DOCUMENTS

| | | | | |
|---|---|---|---|---|
| 10,553,146 | B2 | 2/2020 | Pyo et al. | |
| 2003/0210211 | A1 | 11/2003 | Moon | |
| 2006/0077136 | A1 | 4/2006 | Cok | |
| 2007/0164941 | A1 | 7/2007 | Park et al. | |
| 2009/0251494 | A1* | 10/2009 | Shi | G09G 3/20 345/589 |
| 2012/0299891 | A1 | 11/2012 | Fujiwara et al. | |
| 2014/0176625 | A1 | 6/2014 | Yoon et al. | |
| 2015/0255019 | A1 | 9/2015 | Park et al. | |
| 2016/0117982 | A1 | 4/2016 | Fujii | |
| 2016/0163258 | A1 | 6/2016 | Cho et al. | |
| 2016/0189676 | A1 | 6/2016 | Pyo | |
| 2016/0217722 | A1 | 7/2016 | Fujii | |
| 2016/0307511 | A1 | 10/2016 | Fujii | |
| 2017/0032742 | A1* | 2/2017 | Piper | G09G 3/3233 |
| 2017/0039997 | A1* | 2/2017 | An | G09G 5/10 |
| 2017/0092189 | A1* | 3/2017 | Hwang | G09G 3/3208 |
| 2017/0103707 | A1* | 4/2017 | Park | G09G 3/2003 |
| 2017/0110059 | A1* | 4/2017 | Sung | G09G 3/3275 |
| 2017/0162094 | A1* | 6/2017 | Jee | G09G 3/006 |
| 2017/0169750 | A1* | 6/2017 | Jung | G09G 3/3233 |
| 2017/0200406 | A1* | 7/2017 | Lin | G09G 3/2003 |
| 2017/0206819 | A1* | 7/2017 | Pyo | G09G 3/2092 |
| 2017/0206825 | A1* | 7/2017 | Cha | G09G 3/2092 |
| 2017/0270841 | A1* | 9/2017 | An | G09G 5/005 |
| 2017/0294156 | A1* | 10/2017 | Pyo | G09G 3/2003 |
| 2017/0358275 | A1* | 12/2017 | Klement | G06F 16/951 |
| 2018/0025468 | A1* | 1/2018 | Kim | G06T 3/20 345/682 |
| 2018/0053463 | A1* | 2/2018 | Kong | G09G 3/20 |
| 2018/0197454 | A1* | 7/2018 | Furihata | G09G 3/20 |
| 2018/0204522 | A1* | 7/2018 | Furihata | G09G 3/3275 |
| 2018/0240404 | A1* | 8/2018 | Furihata | G09G 3/2011 |
| 2019/0035357 | A1* | 1/2019 | Lim | G09G 3/3208 |
| 2019/0057644 | A1* | 2/2019 | Yan | G09G 3/3225 |
| 2019/0114963 | A1* | 4/2019 | Choi | H04N 9/73 |
| 2019/0130872 | A1* | 5/2019 | Furihata | G09G 3/3208 |
| 2019/0156770 | A1* | 5/2019 | Zha | G09G 3/342 |
| 2019/0340980 | A1 | 11/2019 | Yum et al. | |
| 2020/0111423 | A1* | 4/2020 | Orio | G09G 3/3291 |
| 2020/0143750 | A1* | 5/2020 | Gao | H10K 59/121 |
| 2020/0143751 | A1* | 5/2020 | Byun | G09G 3/3291 |
| 2020/0279518 | A1 | 9/2020 | Pyo et al. | |
| 2020/0279519 | A1* | 9/2020 | Orio | G09G 5/10 |
| 2020/0302861 | A1* | 9/2020 | Pyo | G09G 3/3225 |
| 2020/0388207 | A1* | 12/2020 | Jo | G09G 3/22 |
| 2020/0396430 | A1* | 12/2020 | Funada | H04N 9/317 |
| 2021/0035512 | A1* | 2/2021 | Yin | G09G 3/3607 |
| 2021/0097958 | A1* | 4/2021 | Fores Herranz | G09G 3/2003 |
| 2021/0225323 | A1* | 7/2021 | Furihata | G09G 5/10 |
| 2021/0225324 | A1* | 7/2021 | Furihata | G09G 3/3233 |
| 2021/0327370 | A1* | 10/2021 | Lan | G09G 3/36 |
| 2021/0335324 | A1* | 10/2021 | Xiao | G09G 5/005 |
| 2021/0358406 | A1* | 11/2021 | Zhang | G09G 3/3233 |
| 2022/0013068 | A1* | 1/2022 | Lin | G09G 3/3233 |
| 2022/0309983 | A1* | 9/2022 | Choi | G09G 3/3275 |

FOREIGN PATENT DOCUMENTS

| | | | |
|---|---|---|---|
| KR | 10-2016-0092539 | A | 8/2016 |
| KR | 10-2017-0066771 | A | 6/2017 |
| KR | 10-2020-0105593 | A | 9/2020 |
| KR | 10-2020-0113068 | A | 10/2020 |

* cited by examiner

DISPLAY DEVICE AND DRIVING METHOD THEREOF

CROSS-REFERENCE TO RELATED APPLICATIONS

This application is a continuation of U.S. patent application Ser. No. 17/248,443, filed Jan. 25, 2021, which claims priority to and the benefit of Korean Patent Application No. 10-2020-0017200, filed Feb. 12, 2020, and Korean Patent Application No. 10-2020-0118662, filed Sep. 15, 2020, the entire content of all of which is incorporated herein by reference.

BACKGROUND

1. Field

Aspects of example embodiments of the present disclosure generally relate to a display device, and a driving method thereof.

2. Related Art

With the development of information technologies, the importance of a display device, which is a connection medium between a user and information, increases. Accordingly, display devices, for example, such as a liquid crystal display device, an organic light emitting display device, and a plasma display device, are being increasingly used.

A display device may include a plurality of pixels, and the pixels may use at least one common power voltage. Voltage drop amounts (e.g., IR drop amounts) of the power voltage of the respective pixels may be different from each other depending on positions and grayscale values of the pixels.

Therefore, various structures and methods for compensating for such a voltage drop amount have been discussed. However, there may be a trade-off issue between power consumption and display quality due to the compensation of the voltage drop amount.

The above information disclosed in this Background section is for enhancement of understanding of the background of the present disclosure, and therefore, it may contain information that does not constitute prior art.

SUMMARY

One or more example embodiments of the present disclosure are directed to a display device capable of improving display quality and reducing power consumption while compensating for a voltage drop amount of a power voltage by using at least one of an input maximum luminance and an on-pixel ratio, and a driving method of the display device.

According to one or more example embodiments of the present disclosure, a display device includes: a plurality of pixels configured to receive data voltages based on converted grayscales; and a grayscale converter configured to: calculate first compensation offsets based on positions of the pixels and input grayscales for the pixels; convert the first compensation offsets into second compensation offsets according to a maximum luminance weight based on an input maximum luminance; and calculate the converted grayscales by applying the second compensation offsets to the input grayscales.

In an example embodiment, when the input maximum luminance is less than a first threshold value, the maximum luminance weight may be increased as the input maximum luminance increases; and when the input maximum luminance is greater than the first threshold value, the maximum luminance weight may be decreased as the input maximum luminance increases.

In an example embodiment, when the input maximum luminance is greater than a first threshold value and less than a second threshold value that is greater than the first threshold value, the maximum luminance weight may correspond to a positive number; when the input maximum luminance corresponds to the second threshold value, the maximum luminance weight may correspond to 0; and when the input maximum luminance is greater than the second threshold value, the maximum luminance weight may correspond to a negative number.

In an example embodiment, the grayscale converter may include: a first lookup table including the positions of the pixels, and voltage drop amounts for reference grayscales for the pixels; a voltage drop amount calculator configured to calculate voltage drop amounts of the input grayscales according to the first lookup table and the input grayscales; and a compensation offset calculator configured to calculate the first compensation offsets corresponding to the voltage drop amounts of the input grayscales.

In an example embodiment, the grayscale converter may further include: a maximum luminance weight provider configured to provide the maximum luminance weight corresponding to the input maximum luminance; a compensation offset converter configured to provide the second compensation offsets by converting the first compensation offsets according to the maximum luminance weight; and a converted grayscale calculator configured to calculate the converted grayscales by applying the second compensation offsets to the input grayscales.

In an example embodiment, the grayscale converter may further include a maximum luminance converter configured to provide the maximum luminance weight provider with a converted input maximum luminance that is converted based on the input grayscales and the input maximum luminance.

In an example embodiment, the maximum luminance converter may include: a target pattern detector configured to provide a pattern detection signal when an on-pixel ratio of the input grayscales is less than a reference ratio; a target luminance detector configured to provide a luminance detection signal when the input maximum luminance is within a reference luminance range; and a maximum luminance mover configured to provide the converted input maximum luminance by converting the input maximum luminance, when the pattern detection signal and the luminance detection signal are received.

In an example embodiment, the maximum luminance mover may be configured to provide the converted input maximum luminance by gradually increasing the input maximum luminance according to time.

In an example embodiment, the maximum luminance converter may further include a frame counter configured to provide a count number by counting frames, and the maximum luminance mover may be configured to provide the converted input maximum luminance by gradually increasing the input maximum luminance according to the count number.

In an example embodiment, the grayscale converter may further include an on-pixel weight provider configured to provide an on-pixel weight corresponding to an on-pixel ratio of the input grayscales, and the compensation offset converter may be configured to provide the second compensation offsets by converting the first compensation offsets according to the maximum luminance weight and the on-pixel weight.

In an example embodiment, when the on-pixel ratio is less than a first threshold ratio, the on-pixel weight may be increased as the on-pixel ratio increases.

In an example embodiment, when the on-pixel ratio is greater than a second threshold ratio that is greater than the first threshold ratio, the on-pixel weight may be decreased as the on-pixel ratio increases, and when the on-pixel ratio is between the first threshold ratio and the second threshold ratio, the on-pixel weight may have a maximum value.

In an example embodiment, the grayscale converter may further include an on-pixel ratio calculator configured to calculate the on-pixel ratio by applying a weight to average values of the input grayscales for each color.

In an example embodiment, the grayscale converter may further include a maximum luminance limiter configured to limit an increase in the second compensation offsets, when the on-pixel ratio decreases to a reference ratio or less.

According to one or more example embodiments of the present disclosure, a method for driving a display device, includes: calculating first compensation offsets based on positions of pixels and input grayscales for the pixels; converting the first compensation offsets into second compensation offsets according to a maximum luminance weight based on an input maximum luminance; calculating converted grayscales by applying the second compensation offsets to the input grayscales; and providing the pixels with data voltages based on the converted grayscales.

In an example embodiment, when the input maximum luminance is less than a first threshold value, the maximum luminance weight may be increased as the input maximum luminance increases, and when the input maximum luminance is greater than a first threshold value, the maximum luminance weight may be decreased as the input maximum luminance increases.

In an example embodiment, when the input maximum luminance is greater than a first threshold value and smaller than a second threshold value that is greater than the first threshold value, the maximum luminance weight may correspond to a positive number, when the input maximum luminance corresponds to the second threshold value, the maximum luminance weight may correspond to 0, and when the input maximum luminance is greater than the second threshold value, the maximum luminance weight may correspond to a negative number.

In an example embodiment, the method may further include: generating a pattern detection signal when an on-pixel ratio of the input grayscales is less than a reference ratio; generating a luminance detection signal when the input maximum luminance is within a reference luminance range; and converting the input maximum luminance when the pattern detection signal and the luminance detection signal are generated.

In an example embodiment, in the converting of the input maximum luminance, the converted input maximum luminance may be provided by gradually increasing the input maximum luminance according to time.

In an example embodiment, the method may further include: providing a count number by counting frames, and in the converting of the input maximum luminance, the converted input maximum luminance may be provided by gradually increasing the input maximum luminance according to the count number.

BRIEF DESCRIPTION OF THE DRAWINGS

The above and other aspects and features of the present disclosure will become more apparent to those skilled in the art from the following detailed description of the example embodiments with reference to the accompanying drawings.

DETAILED DESCRIPTION

Figure 1:
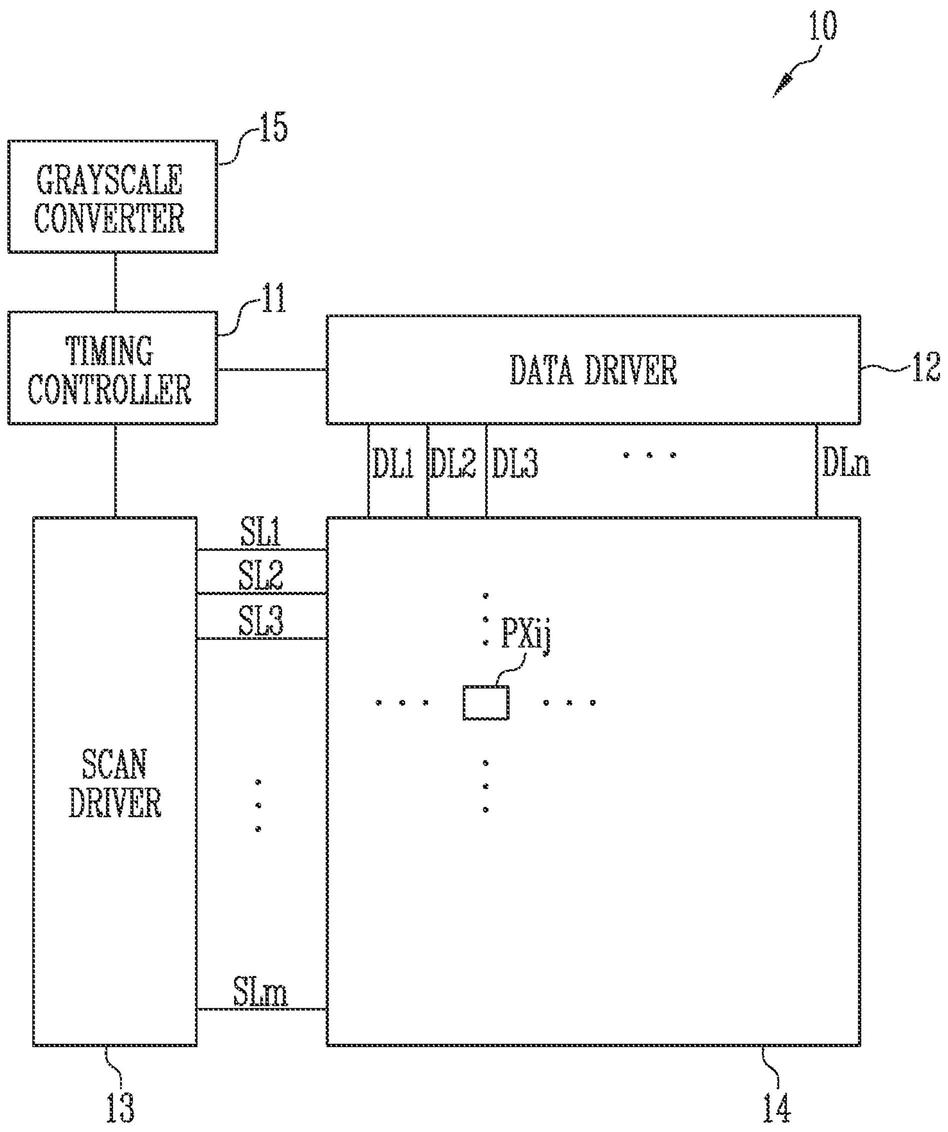
FIG. 1 is a diagram illustrating a display device in accordance with an embodiment of the present disclosure.

Hereinafter, example embodiments will be described in more detail with reference to the accompanying drawings, in which like reference numbers refer to like elements throughout. The present disclosure, however, may be embodied in various different forms, and should not be construed as being limited to only the illustrated embodiments herein. Rather, these embodiments are provided as examples so that this disclosure will be thorough and complete, and will fully convey the aspects and features of the present disclosure to those skilled in the art. Accordingly, processes, elements, and techniques that are not necessary to those having ordinary skill in the art for a complete understanding of the aspects and features of the present disclosure may not be described. Unless otherwise noted, like reference numerals denote like elements throughout the attached drawings and the written description, and thus, descriptions thereof may not be repeated.

In the drawings, the relative sizes and/or thicknesses of elements, layers, and regions may be exaggerated and/or simplified for clarity. Spatially relative terms, such as "beneath," "below," "lower," "under," "above," "upper," and the like, may be used herein for ease of explanation to describe one element or feature's relationship to another element(s) or feature(s) as illustrated in the figures. It will be understood that the spatially relative terms are intended to encompass different orientations of the device in use or in operation, in addition to the orientation depicted in the figures. For example, if the device in the figures is turned over, elements described as "below" or "beneath" or "under" other elements or features would then be oriented "above" the other elements or features. Thus, the example terms "below" and "under" can encompass both an orientation of above and below. The device may be otherwise oriented (e.g., rotated 90 degrees or at other orientations) and the spatially relative descriptors used herein should be interpreted accordingly.

It will be understood that, although the terms "first," "second," "third," etc., may be used herein to describe various elements, components, regions, layers and/or sections, these elements, components, regions, layers and/or sections should not be limited by these terms. These terms are used to distinguish one element, component, region, layer or section from another element, component, region, layer or section. Thus, a first element, component, region, layer or section described below could be termed a second element, component, region, layer or section, without departing from the spirit and scope of the present disclosure.

It will be understood that when an element or layer is referred to as being "on," "connected to," or "coupled to" another element or layer, it can be directly on, connected to, or coupled to the other element or layer, or one or more intervening elements or layers may be present. For example, when an electrode or line is referred to as being "connected to" or "coupled to" another electrode or line, it can be "directly" connected to or coupled to the other electrode or line, or may be "indirectly" connected to or coupled to the other electrode or line with one or more intervening electrodes or lines interposed therebetween. In addition, it will also be understood that when an element or layer is referred to as being "between" two elements or layers, it can be the only element or layer between the two elements or layers, or one or more intervening elements or layers may also be present.

The terminology used herein is for the purpose of describing particular embodiments and is not intended to be limiting of the present disclosure. As used herein, the singular forms "a" and "an" are intended to include the plural forms as well, unless the context clearly indicates otherwise. It will be further understood that the terms "comprises," "comprising," "includes," and "including," "has," "have," and "having," when used in this specification, specify the presence of the stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Expressions such as "at least one of," when preceding a list of elements, modify the entire list of elements and do not modify the individual elements of the list.

As used herein, the term "substantially," "about," and similar terms are used as terms of approximation and not as terms of degree, and are intended to account for the inherent variations in measured or calculated values that would be recognized by those of ordinary skill in the art. Further, the use of "may" when describing embodiments of the present disclosure refers to "one or more embodiments of the present disclosure." As used herein, the terms "use," "using," and "used" may be considered synonymous with the terms "utilize," "utilizing," and "utilized," respectively. Also, the term "exemplary" is intended to refer to an example or illustration.

The electronic or electric devices and/or any other relevant devices or components (e.g., the grayscale converter, the voltage drop amount calculator, the compensation offset calculator, the compensation offset converter, the converted grayscale calculator, the maximum luminance weight provider, the maximum luminance converter, the target pattern detector, the target maximum luminance detector, the maximum luminance mover, the frame counter, the on-pixel weight provider, the on-pixel ratio calculator, the maximum luminance limiter, and/or the like) according to various embodiments of the present disclosure described herein may be implemented utilizing any suitable hardware, firmware (e.g. an application-specific integrated circuit), software, or a combination of software, firmware, and hardware. For example, the various components of these devices may be formed on one integrated circuit (IC) chip or on separate IC chips. Further, the various components of these devices may be implemented on a flexible printed circuit film, a tape carrier package (TCP), a printed circuit board (PCB), or formed on one substrate. Further, the various components of these devices may be a process or thread, running on one or more processors, in one or more computing devices, executing computer program instructions and interacting with other system components for performing the various functionalities described herein. The computer program instructions are stored in a memory which may be implemented in a computing device using a standard memory device, such as, for example, a random access memory (RAM). The computer program instructions may also be stored in other non-transitory computer readable media such as, for example, a CD-ROM, flash drive, or the like. Also, a person of skill in the art should recognize that the functionality of various computing devices may be combined or integrated into a single computing device, or the functionality of a particular computing device may be distributed across one or more other computing devices without departing from the spirit and scope of the exemplary embodiments of the present disclosure.

Unless otherwise defined, all terms (including technical and scientific terms) used herein have the same meaning as commonly understood by one of ordinary skill in the art to which the present disclosure belongs. It will be further understood that terms, such as those defined in commonly used dictionaries, should be interpreted as having a meaning that is consistent with their meaning in the context of the relevant art and/or the present specification, and should not be interpreted in an idealized or overly formal sense, unless expressly so defined herein.

FIG. 1 is a diagram illustrating a display device in accordance with an embodiment of the present disclosure.

Referring to FIG. 1, the display device 10 in accordance with one or more embodiments of the present disclosure may include a timing controller 11, a data driver 12, a scan driver 13, a pixel unit (e.g., a pixel panel or a pixel layer) 14, and a grayscale converter 15.

The timing controller 11 may receive input grayscales and control signals for each frame from an external processor. The input grayscales for the frame may be referred to as frame data. The timing controller 11 may provide the data driver 12, the scan driver 13, and/or the like with control signals that are suitable according to specifications of the data driver 12, the scan driver 13, and/or the like for the purpose of frame display.

The grayscale converter 15 may provide converted grayscales obtained by converting the input grayscales. The timing controller 11 may provide the converted grayscales to the data driver 12. The grayscale converter 15 may be configured as an integrated chip (IC) integrated with the timing controller 11, or may be configured as a separate IC. In some embodiments, the grayscale converter 15 may be implemented as software in the timing controller 11.

The data driver 12 may generate data voltages to be provided to data lines DL1, DL2, DL3, . . . , and DLn, where n may be an integer greater than 0, by using the converted grayscales and the control signals. For example, the data driver 12 may sample the input grayscales by using a clock signal, and may apply data voltages corresponding to the input grayscales to the data lines DL1 to DLn in a unit of a pixel row. The pixel row may refer to a group of pixels that are connected to one scan line (e.g., that are connected to the same scan line).

The scan driver 13 may generate scan signals to be provided to scan lines SL1, SL2, SL3, . . . , and SLm, where m may be an integer greater than 0, by receiving a clock signal, a scan start signal, and/or the like from the timing controller 11.

The scan driver 13 may sequentially supply the scan signals having a pulse of a turn-on level to the scan lines SL1 to SLm. The scan driver 13 may be configured in the form of shift registers, and may include a plurality of scan stages. For example, the scan driver 13 may generate the scan signals by sequentially transferring the scan start signal in the form of the pulse of the turn-on level to a next scan stage under control of the clock signal.

The pixel unit 14 includes a plurality of pixels. Each pixel may be connected to a corresponding data line and a corresponding scan line. For example, an i-jth pixel PXij, where i and j may be integers greater than 0, may refer to a pixel in which a scan transistor thereof is connected to an ith scan line and a jth data line. The pixels may be commonly connected to a first power line ELVDDL and a second power line ELVSSL (e.g., see FIG. 2).

Figure 2:
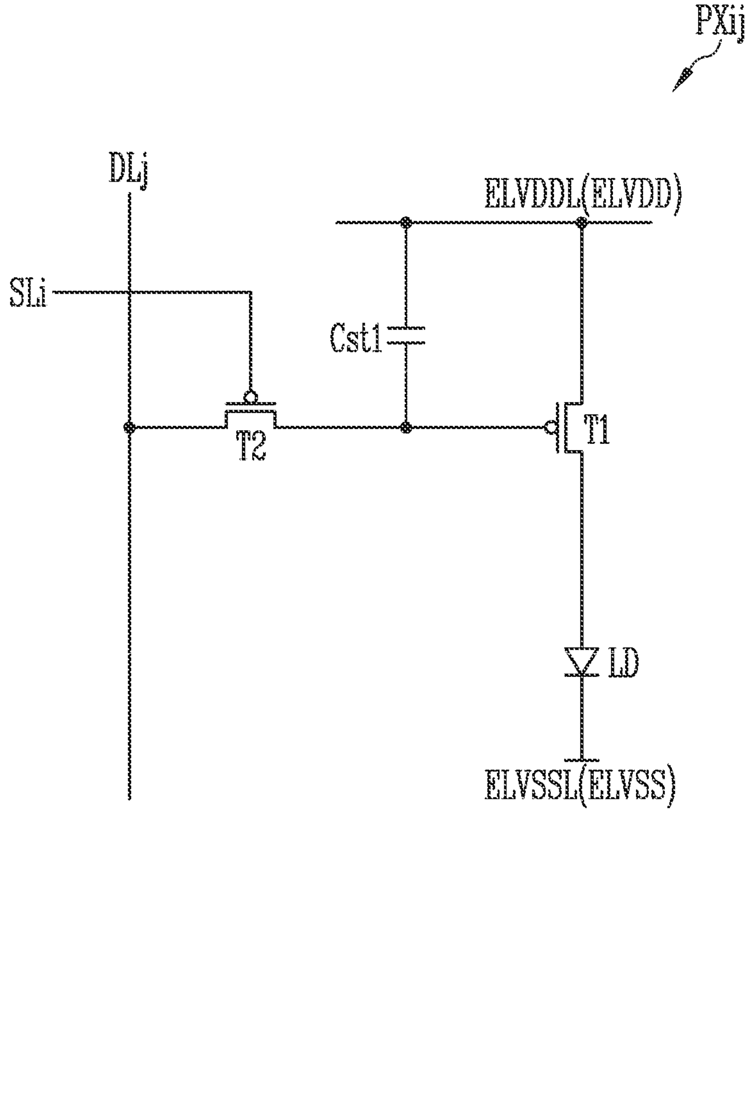
FIG. 2 is a diagram illustrating a pixel in accordance with an embodiment of the present disclosure.

FIG. 2 is a diagram illustrating a pixel in accordance with an embodiment of the present disclosure.

Referring to FIG. 2, the pixel PXij may be a pixel for emitting light of a first color. The other pixels, for example, for emitting light of a second color or a third color, may include the same or substantially the same components as that of the pixel PXij, except for the color emitted by a light emitting diode LD thereof, and therefore, redundant description thereof may not be repeated.

For example, in some embodiments, the first color may be one color from among red, green, and blue, the second color may be another color from among red, green, and blue that is different from the first color, and the third color may be the remaining color from among red, green, and blue that is different from the first and second colors. In other embodiments, instead of the red, green, and blue colors, the first to third colors may be any suitable ones from among magenta, cyan, and yellow.

The pixel PXij may include a plurality of transistors T1 and T2 (e.g., a first transistor T1 and a second transistor T2), a storage capacitor Cst1, and a light emitting diode LD.

Although FIG. 2 illustrates a case where the transistors T1 and T2 are implemented with a P-type transistor, for example, such as a PMOS transistor, the present disclosure is not limited thereto, and those having ordinary skill in the relevant arts may design a pixel circuit that performs the same or substantially the same function using other kinds of transistors, for example, such as an N-type transistor (e.g., an NMOS transistor).

A gate electrode of the transistor (e.g., the second transistor) T2 may be connected to a scan line SLi, a first electrode of the transistor T2 may be connected to a data line DLj, and a second electrode of the transistor T2 may be connected to a gate electrode of the transistor (e.g., the first transistor) T1. The transistor T2 may be referred to as a scan transistor, a switching transistor, and/or the like.

The gate electrode of the transistor (e.g., the first transistor) T1 may be connected to the second electrode of the transistor T2, a first electrode of the transistor T1 may be connected to the first power line ELVDDL, and a second electrode of the transistor T1 may be connected to an anode of the light emitting diode LD. The transistor T1 may be referred to as a driving transistor.

The storage capacitor Cst1 connects the first electrode of the transistor T1 and the gate electrode of the transistor T1 to each other.

The anode of the light emitting diode LD may be connected to the second electrode of the transistor T1, and a cathode of the light emitting diode LD may be connected to the second power line ELVSSL. The light emitting diode LD may be an element for emitting light having a wavelength corresponding to the first color. The light emitting diode LD may be configured as an organic light emitting diode, an inorganic light emitting diode, a quantum dot/well light emitting diode, and/or the like. Although only one light emitting diode LD is illustrated in FIG. 2, the present disclosure is not limited thereto, and in some embodiments, a plurality of sub-light emitting diodes may be connected in series, in parallel, or in series-parallel as the light emitting diode LD.

When a scan signal having a turn-on level (e.g., a low level) is supplied to the gate electrode of the transistor T2 through the scan line SLi, the transistor T2 connects a first electrode of the storage capacitor Cst1 to the data line DLj. Therefore, a voltage corresponding to a difference between a data voltage applied through the data line DLj and a first power voltage ELVDD applied through the first power line ELVDDL may be charged in the storage capacitor Cst1.

The transistor T1 allows a driving current determined according to the voltage charged in the storage capacitor Cst1 to flow from the first power line ELVDDL to the second power line ELVSSL via the light emitting diode LD. The light emitting diode LD emits light having a desired luminance corresponding to an amount of the driving current.

Figure 3:
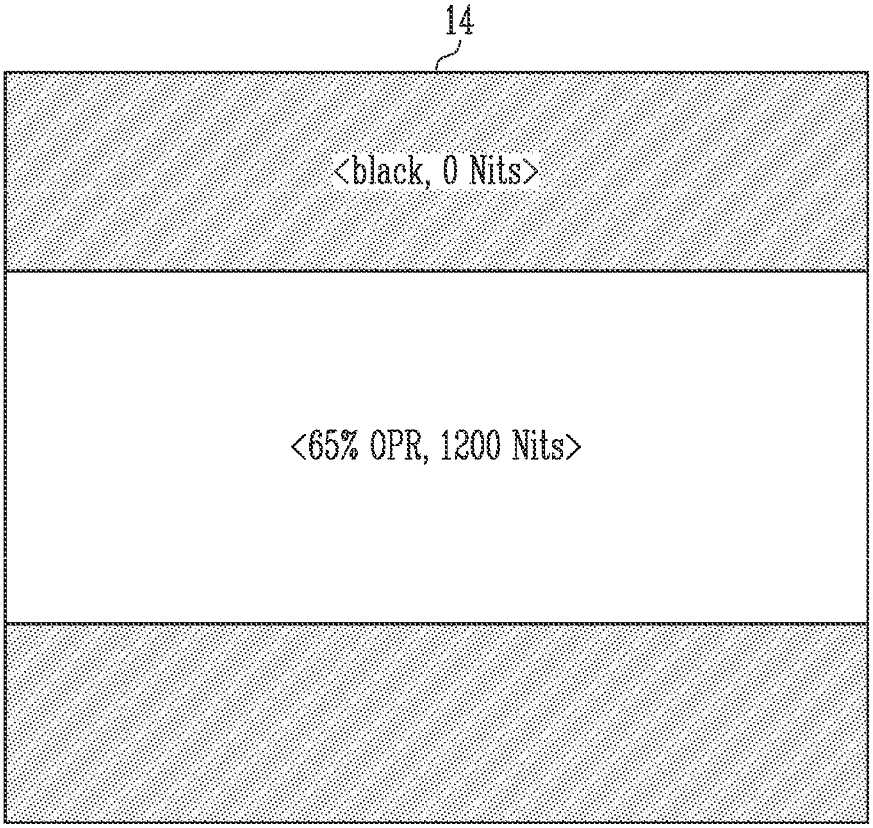
FIGS. 3-4 are diagrams illustrating luminances according to a pattern of frame data when a grayscale converter does not operate.
Figure 4:
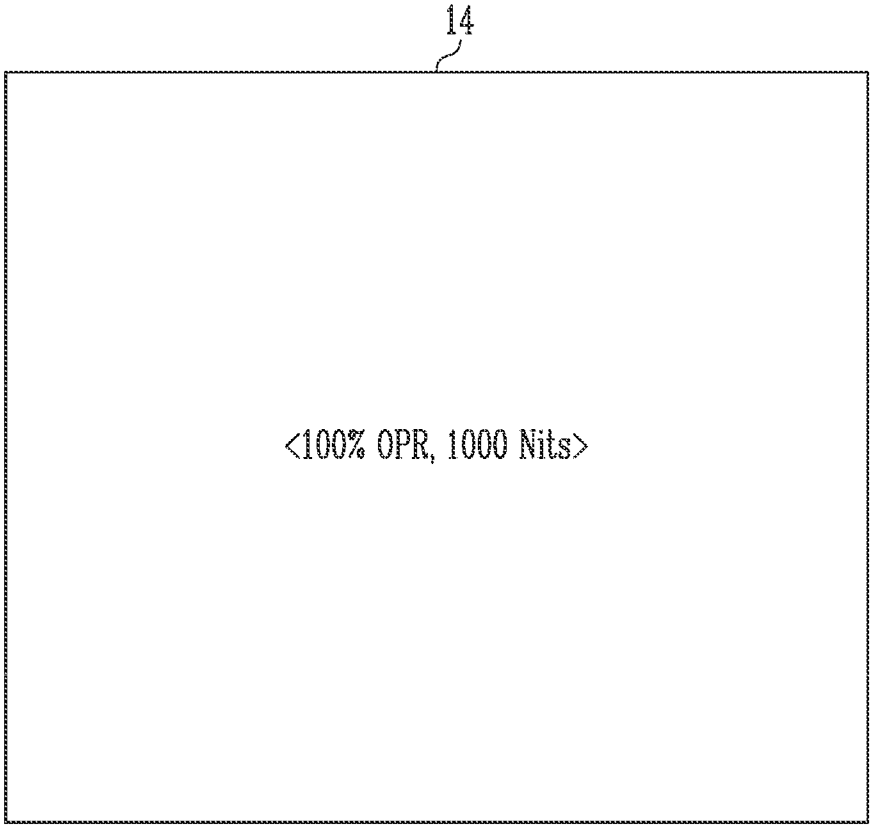

FIGS. 3 and 4 are diagrams illustrating luminances according to a pattern of frame data when the grayscale converter does not operate.

Referring to FIG. 3, the pixel unit 14 is exemplarily illustrated in a state where first pixels from among the plurality of pixels emit light corresponding to a white grayscale (e.g., a white grayscale value or a white gray level), and second pixels from among the plurality of pixels except the first pixels do not emit light corresponding to a black grayscale (e.g., a black grayscale value or a black gray level).

For example, first input grayscales for the first pixels may correspond to the white grayscale, and second input grayscales for the second pixels may correspond to the black grayscale. First frame data may include the first input grayscales and the second input grayscales.

A ratio of the first pixels from among the plurality of pixels may be referred to as an on-pixel ratio OPR. For example, a ratio of a number of pixels displaying the white grayscale (e.g., a number of the first pixels) from among the total number of pixels may be 65%. In this case, an on-pixel ratio OPR of the first frame data may be 65%.

However, the present disclosure is not limited to the on-pixel ratio OPR being determined by using only the pixels displaying the white grayscale and the pixels displaying the black grayscale. For example, the on-pixel ratio OPR may be defined as shown in the following Equation 1.

$$OPR(\%)=((\text{AVG}\_R*WR+\text{AVG}\_G*WG+\text{AVG}\_B*WB)/MG)*100 \quad \text{Equation 1:}$$

In Equation 1, AVG_R may correspond to an average value of red grayscales from among the first frame data, WR may correspond to a first weight, AVG_G may correspond to an average value of green grayscales from among the first frame data, WG may correspond to a second weight, AVG_B may correspond to an average value of blue grayscales from among the first frame data, WB may correspond to a third weight, and MG may correspond to a maximum grayscale value.

For example, each of the red grayscale values may be one from among values of 0 to 255, each of the green grayscale values may be one from among values of 0 to 255, and each of the blue grayscale values may be one from among values of 0 to 255. In this case, MG may be 255.

Each of the first weight WR, the second weight WG, and the third weight WB may be set to ⅓. In another embodiment, each of the first weight WR, the second weight WG, and the third weight WB may correspond to a luminance contribution rate of a corresponding color. For example, the first weight WR may be set to 0.2, the second weight WG may be set to 0.7, and the third weight WB may be set to 0.1. In another embodiment, when an algorithm for minimizing or reducing power consumption is applied, the third weight WB corresponding to blue (e.g., the blue color or the blue grayscales) may be set to be the highest. A sum of the first weight WR, the second weight WG, and the third weight WB may be 1.

According to the above-described Equation 1, the on-pixel ratio OPR may be calculated with respect to various kinds (e.g., all kinds) of frame data.

Before the display device 10 is released, a tuning process for compensating for a process variation and a signal difference according to positions of the pixels may be performed on the display device 10. When the tuning process is not performed, a spot may be viewed in an image. It has been investigated that the on-pixel ratio OPR of frame data most frequently viewed when a user uses the display device 10 is approximately 65%. Therefore, in some embodiments, the display device 10 may be released after the tuning process is performed using frame data of which the on-pixel ratio OPR is 65%.

Due to a limitation of a tact time, input maximum luminances used in the tuning process may correspond to some of the input maximum luminances that may be used by a user.

The input maximum luminance may be a luminance value of light emitted from the pixels corresponding to a maximum grayscale (e.g., a maximum grayscale value or a maximum gray level). For example, the input maximum luminance may be a luminance of white light generated when the pixels (e.g., all of the pixels) of the pixel unit 14 emit light corresponding to the white grayscale. A unit of luminance may be represented as nits. The input maximum luminance may be referred to as a display brightness value DBV.

The pixel unit 14 may display a partially (e.g., a spatially) dark or bright image, but the maximum luminance of an image is limited to the input maximum luminance. The input maximum luminance may be manually set by manipulation of a user, or may be automatically set by an algorithm associated with an illuminance sensor, and/or the like.

Although values of the input maximum luminance may be changed depending on the implementation (e.g., the products), in some embodiments, the maximum value of the input maximum luminance may be, for example, 1200 nits, and the minimum value of the input maximum luminance may be, for example, 4 nits. Because data voltages for some grayscales (e.g., for a specific grayscale) may vary (e.g., may be changed) depending on the input maximum luminances, the emission luminance of a pixel may also vary (e.g., may also be changed).

In FIG. 3, a case where the input maximum luminance is 1200 nits is assumed. Therefore, in this case, a user may view an image of the first frame data, which is optimally tuned in the display device 10, when the on-pixel ratio OPR is 65% and the input maximum luminance is 1200 nits.

Referring to FIG. 4, the pixel unit 14 is exemplarily illustrated in a state where the second pixels, in addition to the first pixels, emit light corresponding to the white grayscale. For example, the first input grayscales for the first pixels may correspond to the white grayscale, and the second input grayscales for the second pixels may correspond to the white grayscale. In other words, in FIG. 4, the on-pixel ratio OPR may be 100%.

Although the input maximum luminance is 1200 nits, the pixel unit 14 may display an image of 1000 nits. This may result when IR drop amounts of the power voltages ELVDD and ELVSS increase according to an increase in the on-pixel ratio OPR (e.g., an increase in load). Accordingly, although a user may set the input maximum luminance to 1200 nits, the maximum luminance that is actually displayed in an image may vary (e.g., may be changed) depending on the on-pixel ratio OPR of the frame data. For example, the maximum luminance displayed in an image may become smaller than 1200 nits as the on-pixel ratio OPR becomes greater than 65%. Further, for example, the maximum luminance displayed in an image may become greater than 1200 nits as the on-pixel ratio OPR becomes smaller than 65%. Accordingly, although a user may set the input maximum luminance (e.g., the same input maximum luminance), the user may view an image having a different maximum luminance (e.g., an unequal maximum luminance) according to the on-pixel ratio OPR (e.g., according to the load).

Figure 5:
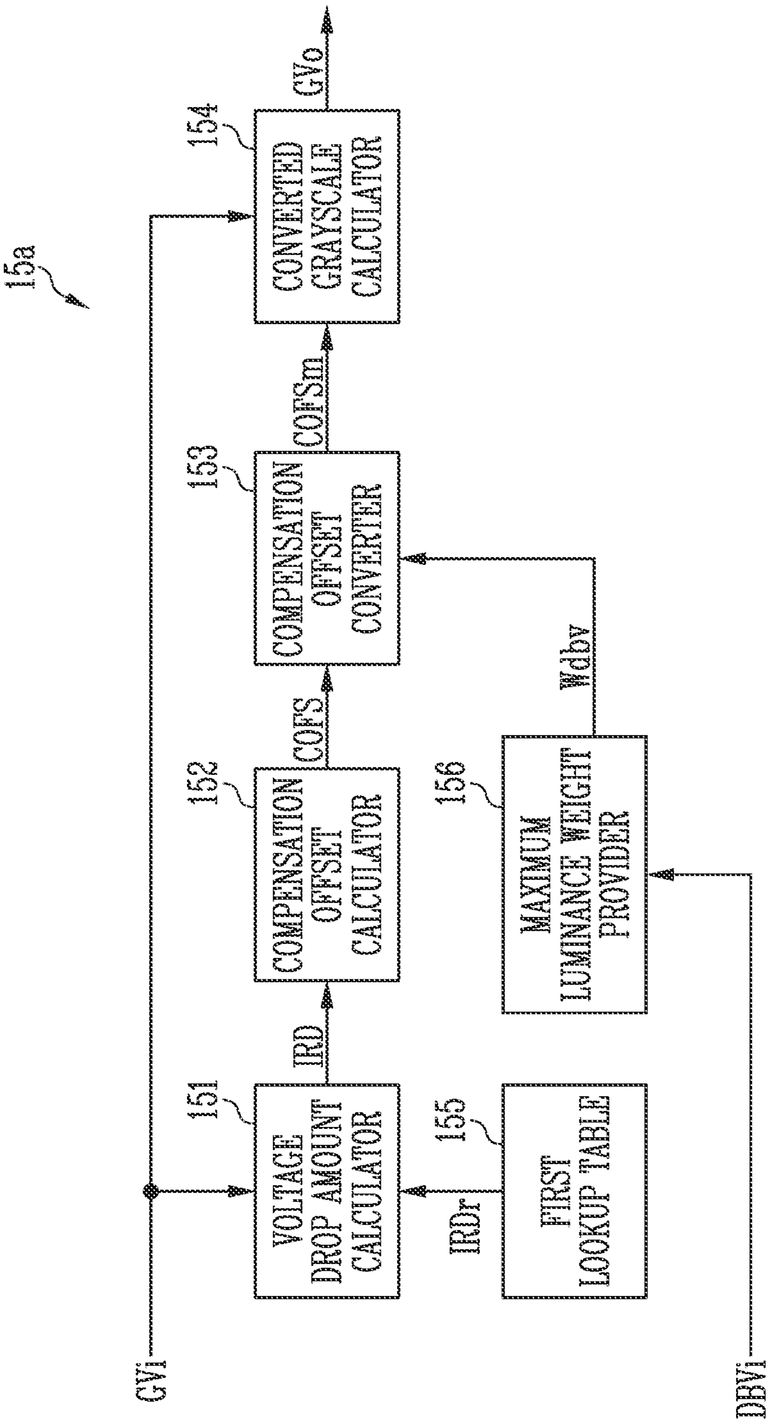
FIG. 5 is a diagram illustrating a grayscale converter in accordance with an embodiment of the present disclosure.
Figure 6:
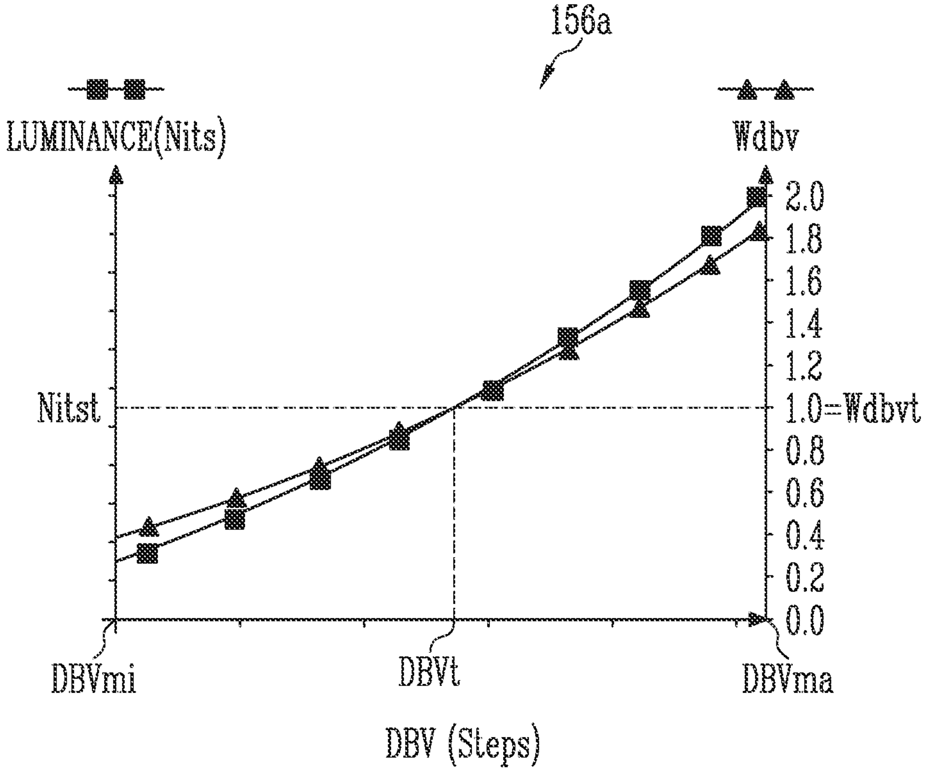
FIGS. 6-8 are diagrams illustrating luminances according to a pattern of frame data when the grayscale converter shown in FIG. 5 operates.
Figure 7:
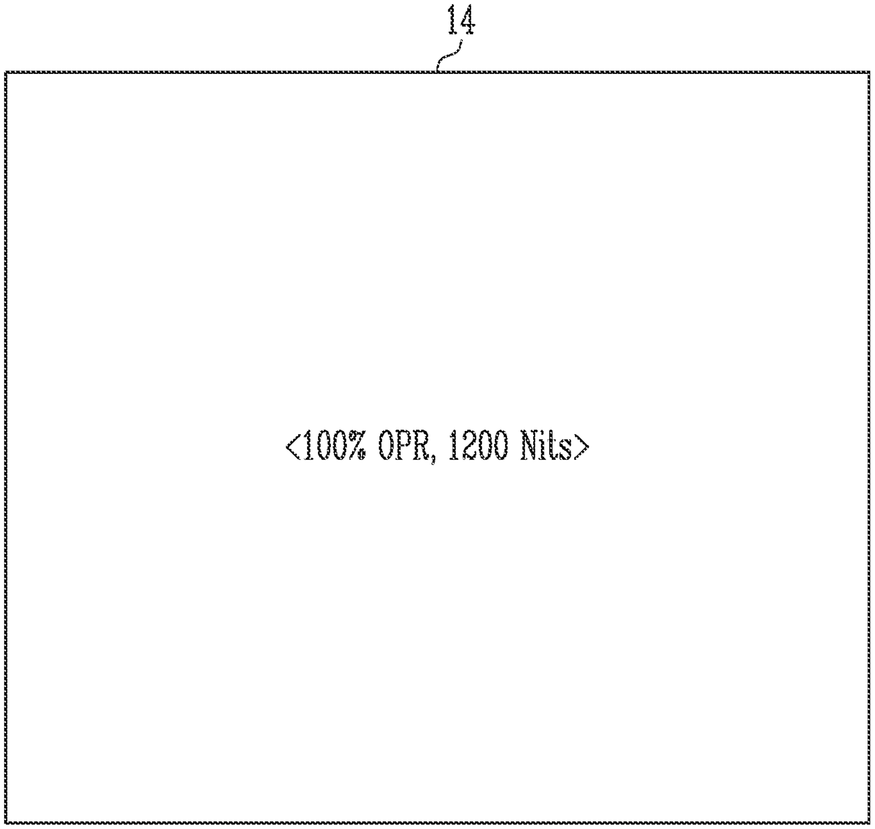
Figure 8:
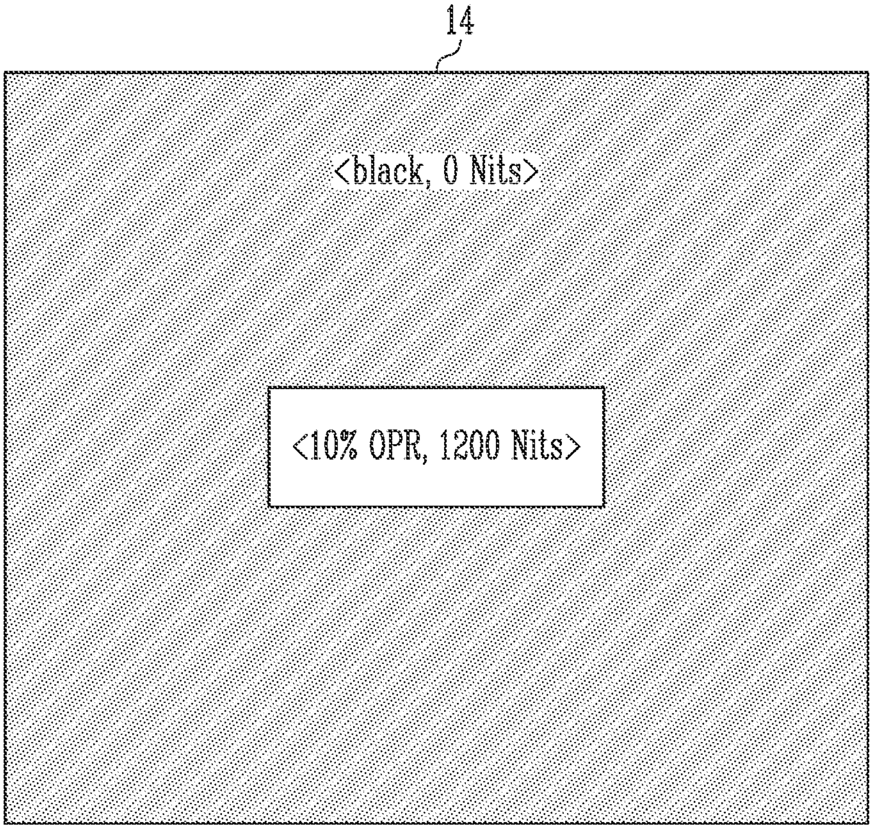

FIG. 5 is a diagram illustrating a grayscale converter in accordance with an embodiment of the present disclosure. FIGS. 6 to 8 are diagrams illustrating luminances according to a pattern of frame data when the grayscale converter shown in FIG. 5 operates.

Referring to FIG. 5, the grayscale converter **15*a* in accordance with one or more example embodiments of the present disclosure may include a voltage drop amount calculator 151, a compensation offset calculator 152, a compensation offset converter 153, a converted grayscale calculator 154, a first lookup table 155, and a maximum luminance weight provider 156**.

The grayscale converter **15*a* may calculate first compensation offsets COFS based on positions of the pixels and input grayscales GVi for the pixels, may convert the first compensation offsets COFS into second compensation offsets COFSm, and may calculate converted grayscales GVo by applying the second compensation offsets COFSm to the input grayscales GVi. The grayscale converter 15*a*** may convert the first compensation offsets COFS into the second compensation offsets COFSm according to a maximum luminance weight Wdbv based on the input maximum luminance DBVi. The pixels may receive data voltages based on the converted grayscales GVo.

The first lookup table 155 may include positions of the pixels, and voltage drop amounts IRDr of reference grayscales for the pixels. The voltage drop amounts IRDr may correspond to an IR drop amount. The first lookup table 155 may be implemented with a memory or other suitable storage media. As described above, due to the limitation of a tact time, it may be inefficient to organize the first lookup table 155 corresponding to all input maximum luminances DBVi and all input grayscales GVi. Therefore, the first lookup table 155 may be organized based on reference grayscales corresponding to some of the available input grayscales GVi, and a reference input maximum luminance corresponding to some of the available input maximum luminances DBVi.

The voltage drop amount calculator 151 may calculate voltage drop amounts IRD of the input grayscales GVi with reference to the first lookup table 155 and the input grayscales GVi. The voltage drop amount calculator 151 may calculate the voltage drop amounts IRD based on differences between the input grayscales GVi and the reference grayscales.

In another embodiment, the voltage drop amount calculator 151 may further receive an input maximum luminance DBVi. In this case, the voltage drop amount calculator 151 may calculate the voltage drop amounts IRD based on a difference between the input maximum luminance DBVi and the reference input maximum luminance, in addition to the differences between the input grayscales GVi and the reference grayscales.

The compensation offset calculator 152 may calculate first compensation offsets COFS corresponding to the voltage drop amounts IRD. For example, the first compensation offsets COFS may increase as the voltage drop amounts IRD increase. In accordance with an embodiment, when the on-pixel ratio OPR of the frame data is greater than a reference on-pixel ratio (e.g., 65%), the first compensation offsets COFs may correspond to a positive number. Further, when the on-pixel ratio OPR of the frame data is smaller than the reference on-pixel ratio, the first compensation offsets COFS may correspond to a negative number.

The maximum luminance weight provider 156 may provide a maximum luminance weight Wdbv corresponding to the input maximum luminance DBVi. The maximum luminance weight provider 156 may increase the maximum luminance weight Wdbv as the input maximum luminance DBVi increases.

Referring to FIG. 6, a reference maximum luminance weight Wdbvt, which enables the pixel unit 14 to exhibit a reference luminance Nitst in a reference input maximum luminance DBVt at a tuning time, may be set to 1. An on-pixel ratio OPR at the tuning time may be referred to as the reference on-pixel ratio (e.g., 65%). For example, when the input maximum luminance DBVi is greater than the reference input maximum luminance DBVt, the maximum luminance weight provider 156 may provide a maximum luminance weight Wdbv greater than 1. When the input maximum luminance DBVi is smaller than the reference input maximum luminance DBVt, the maximum luminance weight provider 156 may provide a maximum luminance weight Wdbv smaller than 1.

The compensation offset converter 153 may provide the second compensation offsets COFSm by converting the first compensation offsets COFS according to the maximum luminance weight Wdbv. For example, the compensation offset converter 153 may provide the second compensation offsets COFSm by multiplying the first compensation offsets COFS and a corresponding maximum luminance weight Wdbv. Therefore, when the input maximum luminance DBVi is equal to the reference input maximum luminance DBVt, the first compensation offsets COFS and the second compensation offsets COFSm may be the same or substantially the same as each other. When the input maximum luminance DBVi is greater than the reference input maximum luminance DBVt, the second compensation offsets COFSm may be greater than the first compensation offsets COFS. When the input maximum luminance DBVi is smaller than the reference input maximum luminance DBVt, the second compensation offsets COFSm may be smaller than the first compensation offsets COFS.

The converted grayscale calculator 154 may calculate converted grayscales GVo by applying the second compensation offsets COFSm to the input grayscales GVi. For example, the converted grayscale calculator 154 may calculate the converted grayscales GVo for the respective pixels by adding the input grayscales GVi and the corresponding second compensation offsets COFSm.

FIGS. 7 and 8 are diagrams illustrating luminances according to a pattern of frame data when the grayscale converter shown in FIG. 5 operates.

Referring to FIG. 7, the pixel unit 14 may display an image having a luminance of 1200 nits, even when the on-pixel ratio OPR of the frame data is 100%. In other words, because the on-pixel ratio OPR is greater than the reference on-pixel ratio (e.g., 65%), the first compensation offsets COFS and the second compensation offsets COFSm may correspond to a positive number, and the converted grayscales GVo may be greater than the input grayscales GVi.

Referring to FIG. 8, the pixel unit 14 may display an image having a luminance of 1200 nits, even when the on-pixel ratio OPR of the frame data is 10%. In other words, because the on-pixel ratio OPR is smaller than the reference on-pixel ratio (e.g., 65%), the first compensation offsets COFS and the second compensation offsets COFSm may correspond to a negative number, and the converted grayscales GVo may be smaller than the input grayscales GVi.

According to one or more example embodiments of the present disclosure, unlike the cases shown in FIGS. 3 and 4, when a user sets the input maximum luminance (e.g., the same input maximum luminance), the user may view an image having the same or substantially the same maximum luminance (e.g., an equal or substantially equal maximum luminance) even when the on-pixel ratio OPR (e.g., the load) is changed.

When the on-pixel ratio OPR is 100% as shown in FIG. 7, the difference between the first power voltage ELVDD and the second power voltage ELVSS may be large (e.g., may be very large), such that the display unit 14 displays an image of 1200 nits. However, it may be difficult to set the second power voltage ELVSS to be sufficiently low, and/or to set the first power voltage ELVDD to be sufficiently high.

Figure 9:
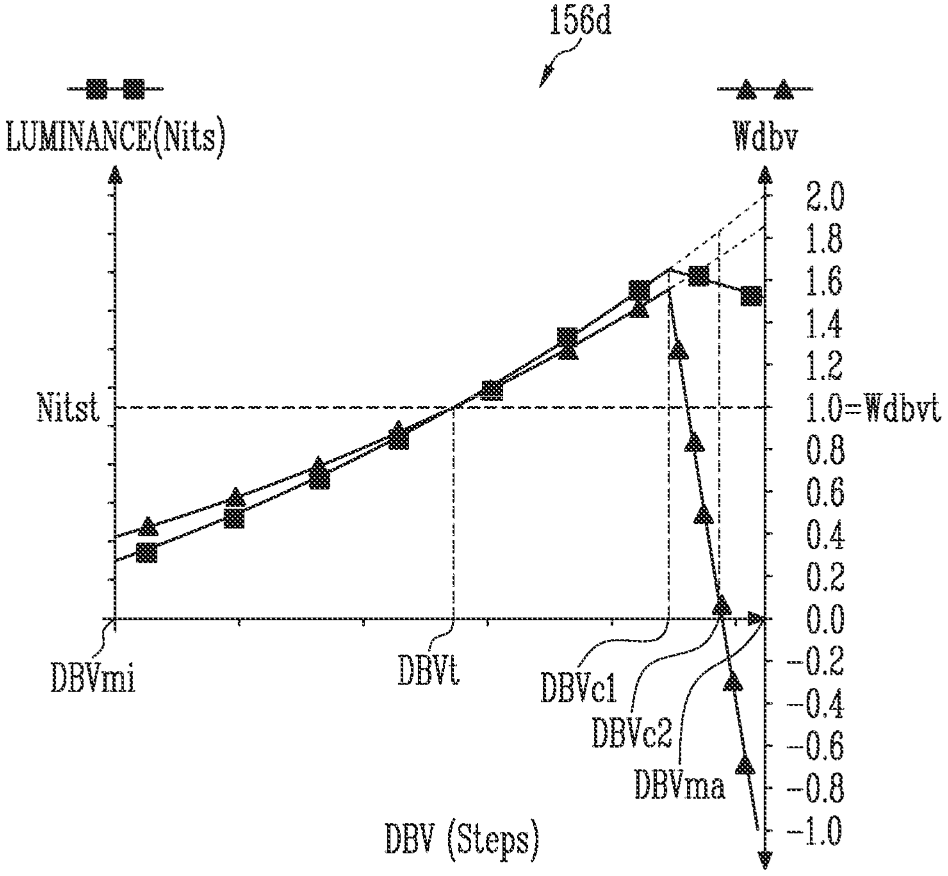
FIG. 9 is a diagram illustrating an operation of a maximum luminance weight provider in accordance with an embodiment of the present disclosure.

FIG. 9 is a diagram illustrating an operation of a maximum luminance weight provider in accordance with an embodiment of the present disclosure.

When the input maximum luminance DBVi is smaller than a first threshold value DBVc1, the maximum luminance weight provider 156*d* in accordance with one or more embodiments of the present disclosure may increase the maximum luminance weight Wdbv as the input maximum luminance DBVi increases. Further, when the input maximum luminance DBVi is greater than the first threshold value DBVc1, the maximum luminance weight provider 156*d* may decrease the maximum luminance weight Wdbv as the input maximum luminance DBVi increases.

Further, when the input maximum luminance DBVi is greater than the first threshold value DBVc1 and less than a second threshold value DBVc2, the maximum luminance weight Wdbv may correspond to a positive number. When the input maximum luminance DBVi corresponds to (e.g., is equal to or substantially equal to) the second threshold value DBVc2, the maximum luminance weight Wdbv may correspond to (e.g., may be equal to or substantially equal to) 0. Further, when the input maximum luminance DBVi is greater than the second threshold value DBVc2, the maximum luminance weight Wdbv may correspond to a negative number. The second threshold value DBVc2 may be greater than the first threshold value DBVc1.

Figure 10:
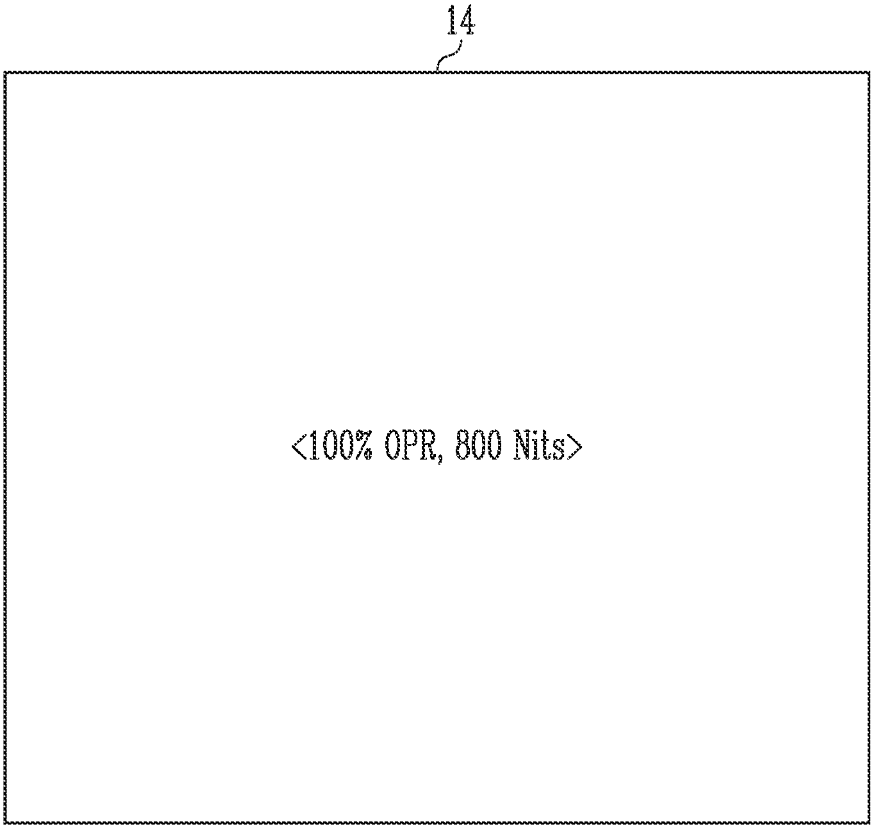
FIGS. 10-11 are diagrams illustrating luminances according to a pattern of frame data when the maximum luminance weight provider shown in FIG. 9 operates.
Figure 11:
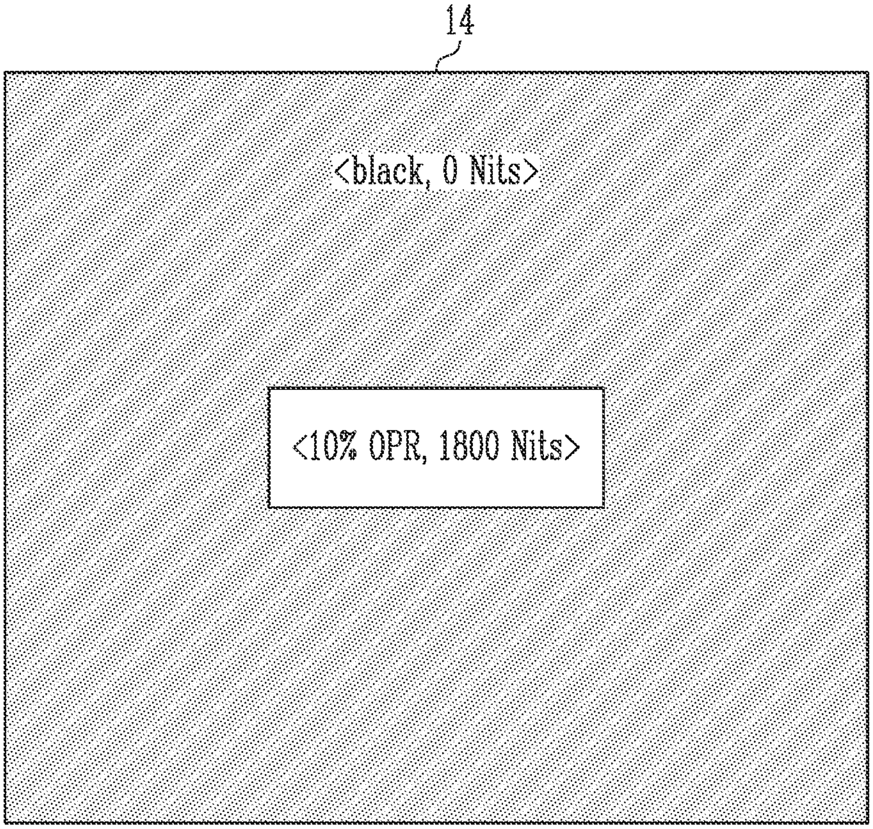

FIGS. 10 and 11 are diagrams illustrating luminances according to a pattern of frame data when the maximum luminance weight provider shown in FIG. 9 operates.

According to the maximum luminance weight provider 156*d* described with reference to FIG. 9, when an input maximum luminance DBVi set by a user is smaller than the first threshold value DBVc1, the user may view an image having a uniform or substantially uniform maximum luminance, even when the on-pixel ratio OPR is changed.

For example, in a case where the pixels (e.g., all the pixels) of the pixel unit 14 are configured with first pixels and second pixels except the first pixels, first frame data may include first input grayscales for the first pixels and second input grayscales for the second pixels. The first input grayscales may correspond to a white grayscale (e.g., a white gray value or level), and the second input grayscales may correspond to a black grayscale (e.g., a black gray value or level). An on-pixel ratio OPR may be referred to as a first ratio. A case where the input maximum luminance DBVi has a first value smaller than the first threshold value DBVc1 is assumed. The luminance of light emitted from the first pixels is assumed as a first luminance.

For example, second frame data may include first input grayscales for the first pixels, and second input grayscales for the second pixels. The first input grayscales may correspond to the white grayscale, some of the second input grayscales may correspond to the white grayscale, and others of the second input grayscales may correspond to the black grayscale. An on-pixel ratio OPR may be referred to as a second ratio. In other words, the second ratio of the second frame data may be greater than the first ratio of the first frame data. A case where the input maximum luminance DBVi has the first value is assumed. The luminance of light emitted from the first pixels may be a second luminance equal to or substantially equal to the first luminance. Further, the luminance of light emitted from the second pixels corresponding to the white grayscale may be the second luminance. In other words, when the input maximum luminance DBVi is smaller than the first threshold value DBVc1, the image may have a uniform or substantially uniform maximum luminance, regardless of the on-pixel rate OPR.

According to the maximum luminance weight provider 156*d* shown in FIG. 9, when the input maximum luminance set by the user is greater than the first threshold value DBVc1, the user may view an image having various maximum luminances according to the on-pixel ratio OPR.

For example, when the first frame data is input to the display device 10, the input maximum luminance DBVi has a second value instead of the first value, and the on-pixel ratio OPR is the first ratio, the first pixels may emit light with a third luminance (e.g., 1800 nits as shown in FIG. 11). The second value may be greater than the first value. For example, the second value may be greater than the first threshold value DBVc1.

For example, when the second frame data is input to the display device 10, the input maximum luminance DBVi has the second value, and the on-pixel ratio OPR is the second ratio, the first pixels may emit light with a fourth luminance (e.g., 800 nits) lower than the third luminance (e.g., see FIG. 10). The second ratio may be greater than the first ratio.

In accordance with the present embodiment, as for a high input maximum luminance DBVi, power consumption may be decreased at a high on-pixel ratio OPR (e.g., see FIG. 10), and the maximum luminance may be increased at a low on-pixel ratio OPR (e.g., see FIG. 11). The increase in the maximum luminance allows a dark area and a bright area of a display screen to be contrasted (e.g., to be extremely contrasted), and thus, it may be desirable to apply a High Dynamic Range (HDR) technique. Accordingly, the increase in the maximum luminance may be helpfully used for an image effect, for example, such as stars shining in the night sky.

As described with reference to FIG. 7, when the input maximum luminance DBVi is greater than the first threshold value DBVc1, it may be difficult to provide an image with a uniform or substantially uniform maximum luminance, regardless of the on-pixel ratio OPR, due to limitations of hardware of the display device 10 and/or other limitations. Thus, the effect shown in FIGS. 10 and 11 may be more desirable.

In FIG. 10, because the first compensation offsets COFS correspond to a positive number, the second compensation offsets COFSm multiplied by the maximum luminance weight Wdbv corresponding to a negative number become a negative number. Accordingly, the converted grayscales GVo may become smaller than the input grayscales GVi. For example, when the input maximum luminance DBVi corresponds to 1200 nits as the maximum value DBVma, and the on-pixel ratio OPR is 100%, an image may have a maximum luminance of 800 nits.

In FIG. 11, because the first compensation offsets COFS correspond to a negative number, the second compensation offsets COFSm multiplied by the maximum luminance weight Wdbv corresponding to a negative number become a positive number. Accordingly, the converted grayscales GVo may become greater than the input grayscales GVi. For example, when the input maximum luminance DBVi corresponds to the maximum value DBVma, and the on-pixel ratio OPR is 10%, an image may have a maximum luminance of 1800 nits.

Figure 12:
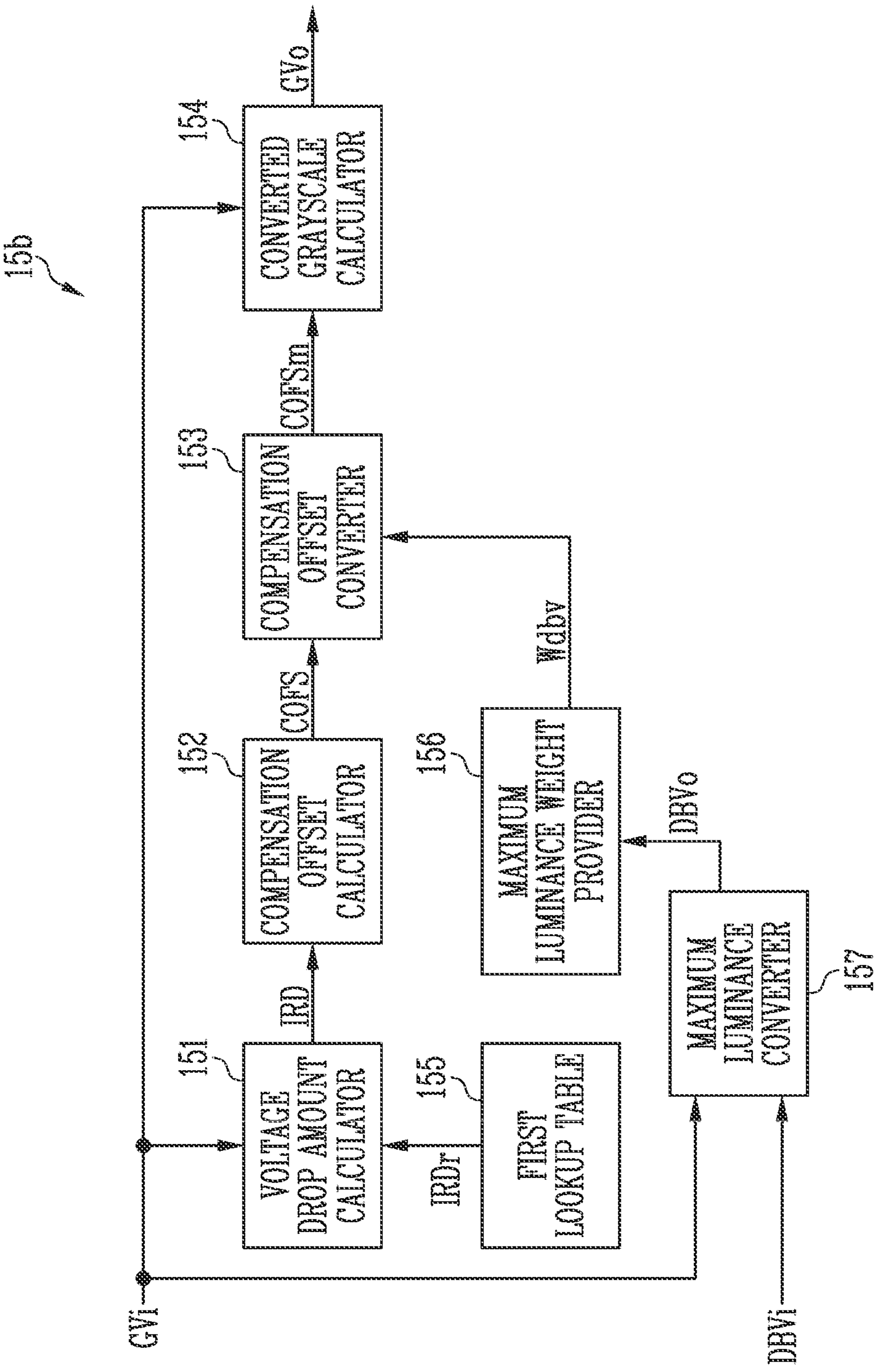
FIG. 12 is a diagram illustrating a grayscale converter in accordance with another embodiment of the present disclosure.

FIG. 12 is a diagram illustrating a grayscale converter in accordance with another embodiment of the present disclosure.

The grayscale converter 15*b* shown in FIG. 12 may be different from the grayscale converter 15*a* shown in FIG. 5, in that the grayscale converter 15*b* of FIG. 12 further includes a maximum luminance converter 157. Accordingly, the differences therebetween may be mainly described hereinafter, and redundant description of the same or substantially the same components thereof may not be repeated.

The maximum luminance converter 157 may provide a converted input maximum luminance DBVo to the maximum luminance weight provider 156, which may be converted based on the input grayscales GVi and the input maximum luminance DBVi.

Figure 13:
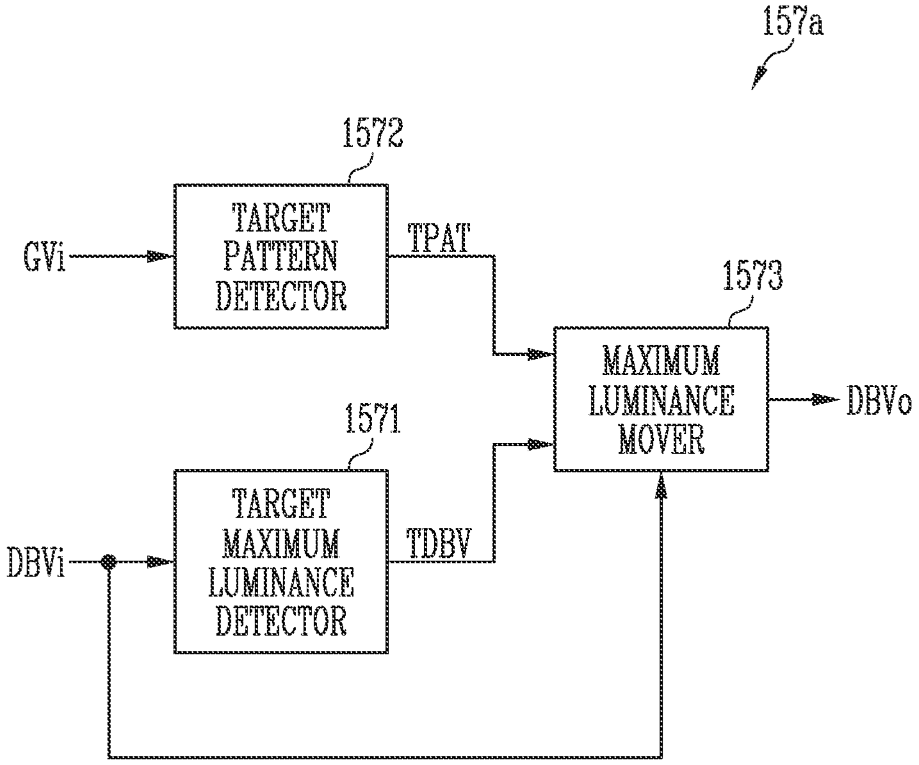
FIGS. 13-14 are diagrams illustrating a maximum luminance converter in accordance with an embodiment of the present disclosure.
Figure 14:
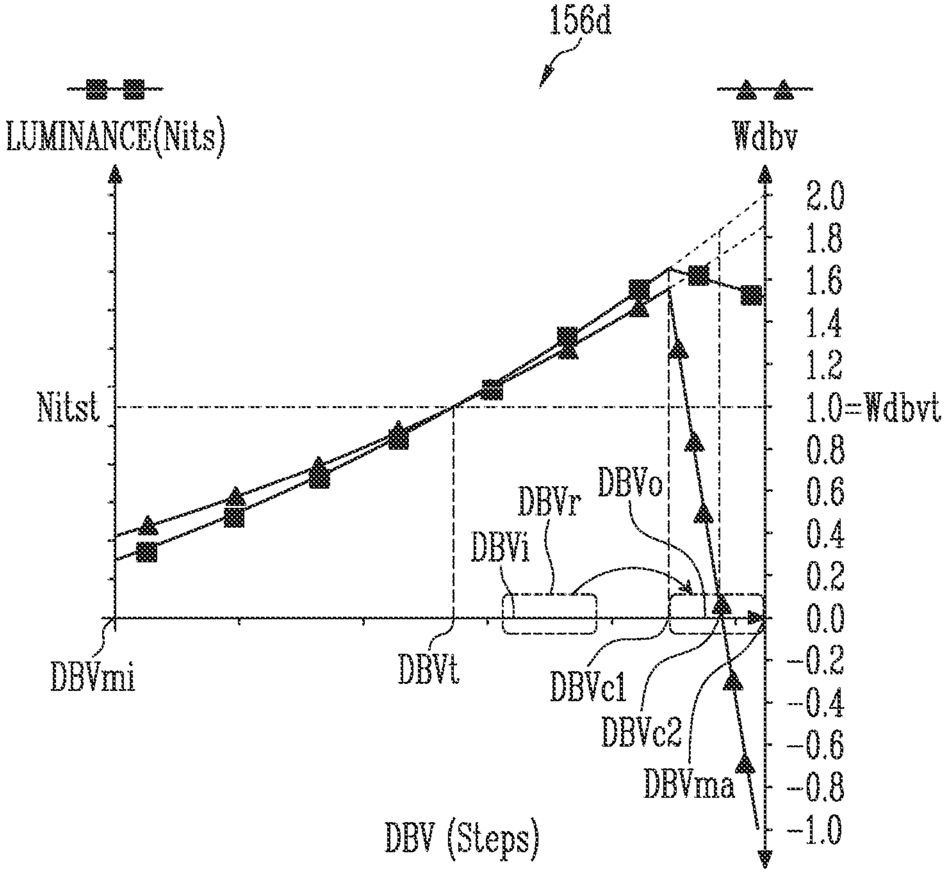

FIGS. 13 and 14 are diagrams illustrating a maximum luminance converter in accordance with an embodiment of the present disclosure.

Referring to FIG. 13, the maximum luminance converter 157*a* in accordance with one or more embodiments of the present disclosure may include a target maximum luminance detector 1571, a target pattern detector 1572, and a maximum luminance mover 1573.

The target maximum luminance detector 1571 may provide a luminance detection signal TDBV when the input maximum luminance DBVi belongs to (e.g., has a value within) a reference luminance range DBVr. For example, the reference luminance range DBVr may be smaller than the first threshold value DBVc1.

The target pattern detector 1572 may provide a pattern detection signal TPAT when the on-pixel ratio OPR of the input grayscales GVi is smaller than a reference ratio.

When the maximum luminance mover 1573 receives the pattern detection signal TPAT and the luminance detection signal TDBV, the maximum luminance mover 1573 may provide the converted input maximum luminance DBVo by converting the input maximum luminance DBVi.

In other words, according to the target maximum luminance detector 1571 and the target pattern detector 1572, frame data used for contrast emphasis, for example, such as stars twinkling in the night sky, may be detected. As for the frame data, the input maximum luminance DBVi is increased even when the input maximum luminance DBVi is smaller than the first threshold value DBVc1, so that the effects in accordance with the embodiment shown in FIGS. 9 and 11 may be achieved and exhibited.

Figure 15:
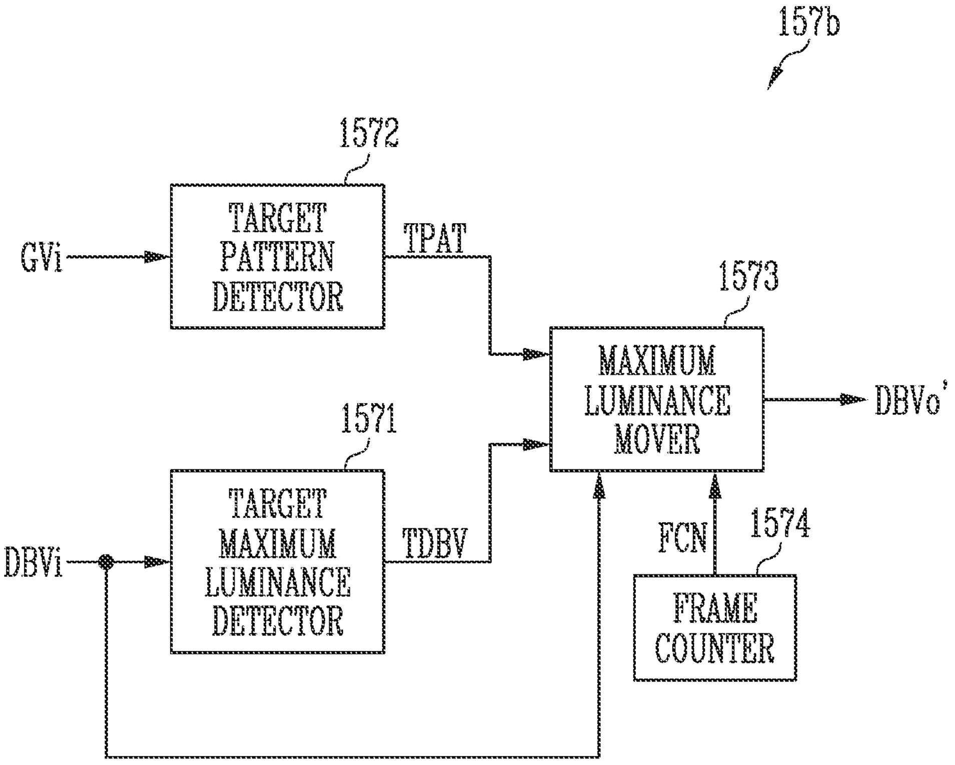
FIGS. 15-16 are diagrams illustrating a maximum luminance converter in accordance with another embodiment of the present disclosure.
Figure 16:
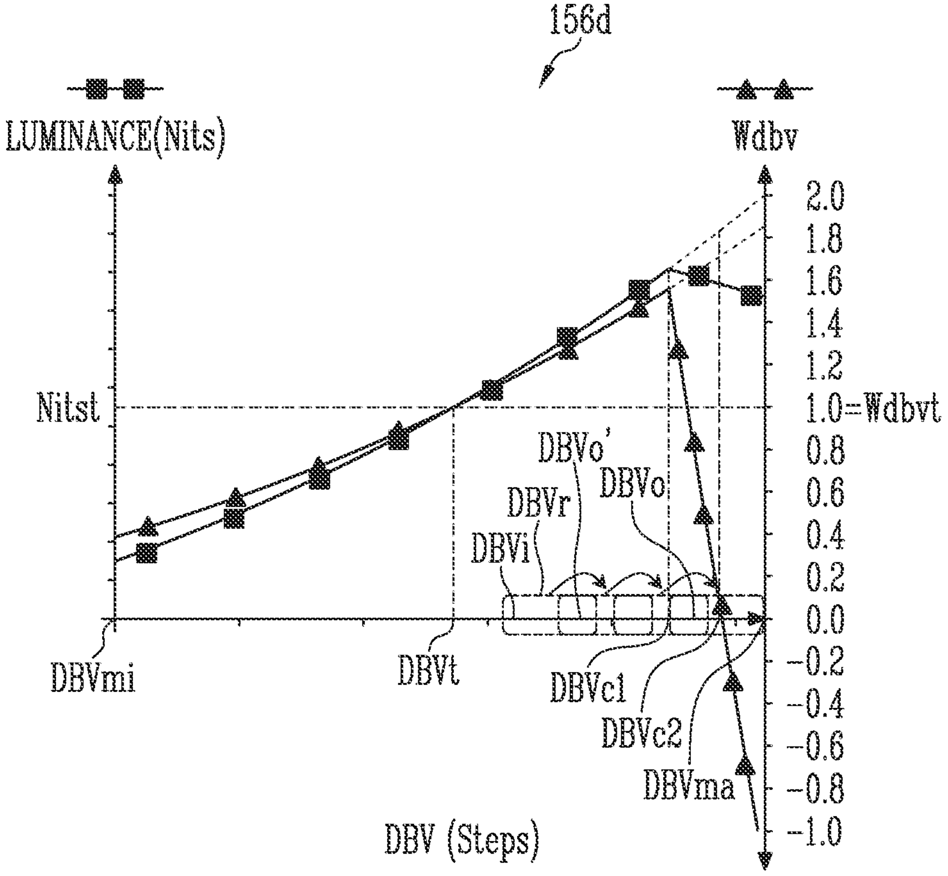

FIGS. 15 and 16 are diagrams illustrating a maximum luminance converter in accordance with another embodiment of the present disclosure.

Referring to FIG. 15, as compared with the maximum luminance converter **157*a* shown in FIG. 13, the maximum luminance converter 157*b* of FIG. 15 in accordance with one or more embodiments of the present disclosure may further include a frame counter 1574**. Accordingly, the differences therebetween may be mainly described hereinafter, and redundant description of the same or substantially the same components thereof may not be repeated.

The frame counter 1574 may provide a count number FCN by performing frame counting. A vertical synchronization signal (e.g., a VSYNC signal) may be used for the frame counting.

The maximum luminance mover 1573 may provide a converted input maximum luminance DBVo' by gradually increasing the input maximum luminance DBVi according to time. For example, the maximum luminance mover 1573 may provide the converted input maximum luminance DBVo' by gradually increasing the input maximum luminance DBVi according to the count number FCN.

When the input maximum luminance is converted (e.g., suddenly converted or directly converted) into the input maximum luminance DBVo (e.g., without considering the count number FCN), a user may view a luminance change of an image, for example, such as glittering. In accordance with the present embodiment, a finally converted input maximum luminance DBVo' is provided by gradually increasing the input maximum luminance DBVi according to time (e.g., according to the count number FCN), so that incompatibility of the user may be reduced.

In accordance with an embodiment, when at least one of the pattern detection signal TPAT and the luminance detection signal TDBV is not generated, it may be desired for the converted input maximum luminance DBVo to return to the input maximum luminance DBVi before conversion. A second speed at which the converted input maximum luminance DBVo decreases to the input maximum luminance DBVi before conversion may be higher than a first speed at which the input maximum luminance DBVi increases to the converted input maximum luminance DBVo. For example, when the first speed is 3 DBV/100 DBV, the second speed may be 5DVB/100 DBV. Thus, an undesirable (e.g., an unnecessary) emphasis effect may be prevented or reduced.

Figure 17:
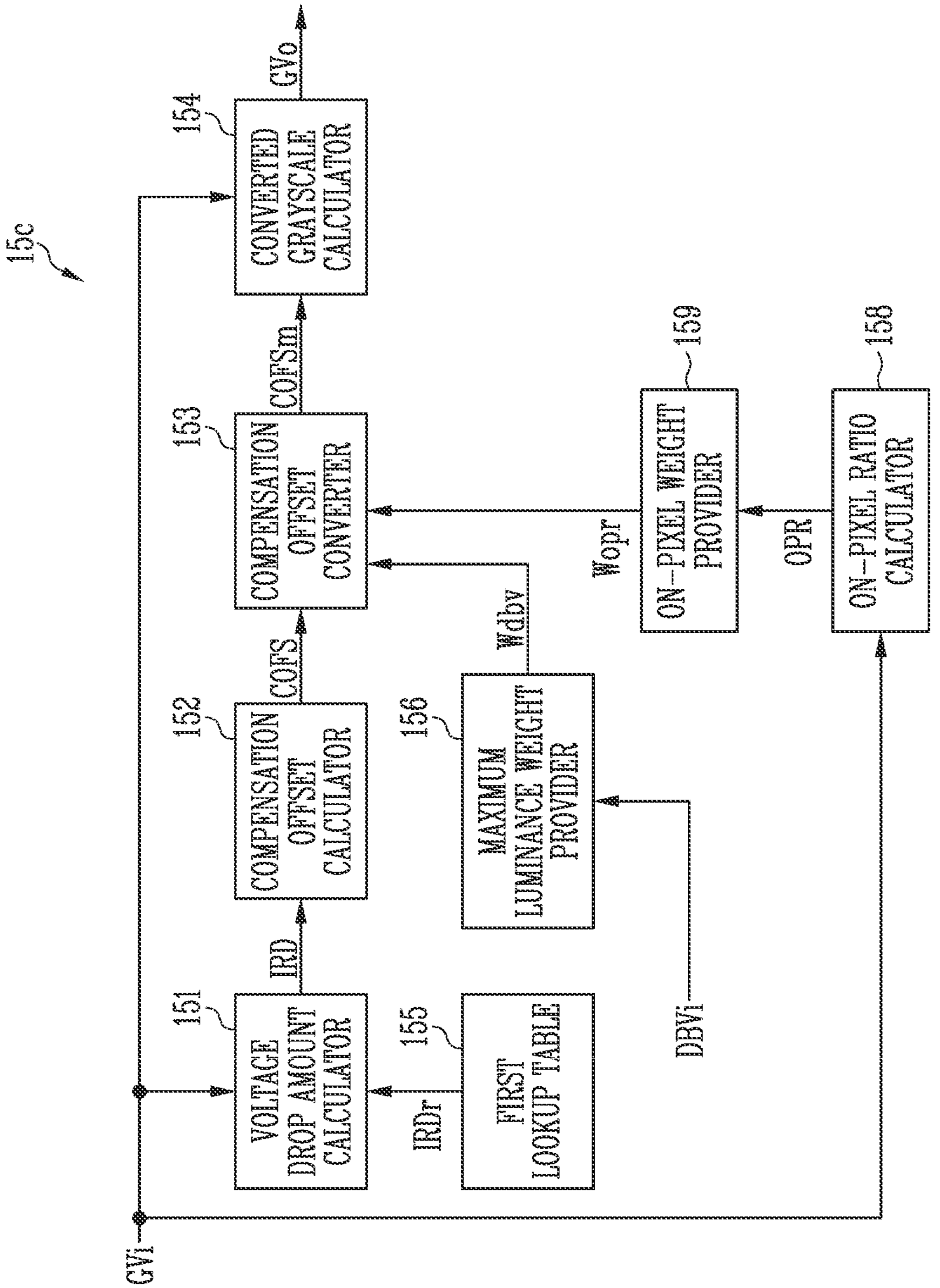
FIG. 17 is a diagram illustrating a grayscale converter in accordance with another embodiment of the present disclosure.

FIG. 17 is a diagram illustrating a grayscale converter in accordance with another embodiment of the present disclosure.

As compared with the grayscale converter **15*a* shown in FIG. 5, the grayscale converter 15*c* shown in FIG. 17 may further include an on-pixel ratio calculator 158 and an on-pixel weight provider 159**. Accordingly, the differences therebetween may be mainly described hereinafter, and redundant description of the same or substantially the same components thereof may not be repeated.

The on-pixel ratio calculator 158 may calculate an on-pixel ratio OPR by applying a weight to average values of input grayscales GVi for each color. For example, the on-pixel ratio calculator 158 may calculate the on-pixel ratio OPR according to the above-described Equation 1.

The on-pixel weight provider 159 may provide an on-pixel weight Wopr corresponding to the on-pixel ratio OPR of the input grayscales GVi.

The compensation offset converter 153 may provide second compensation offsets COFSm by converting first compensation offsets COFS according to the maximum luminance weight Wdbv and the on-pixel weight Wopr. For example, the compensation offset converter 153 may calculate the second compensation offsets COFSm by multiplying the first compensation offsets COFS by the maximum luminance weight Wdbv and the on-pixel weight Wopr.

Figure 18:
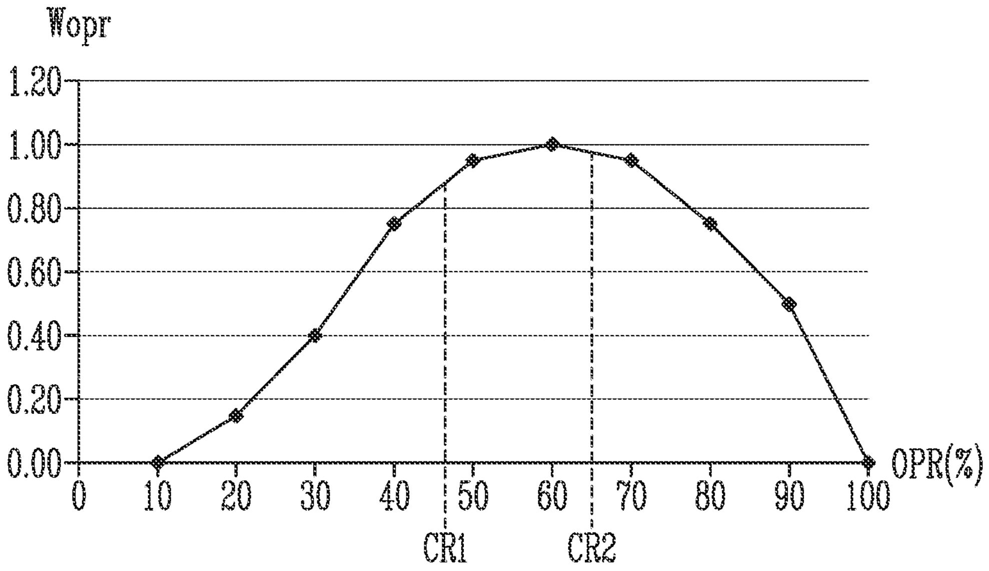
FIG. 18 is a diagram illustrating an on-pixel weight provider in accordance with an embodiment of the present disclosure.

FIG. 18 is a diagram illustrating an on-pixel weight provider in accordance with an embodiment of the present disclosure.

For example, when the on-pixel ratio OPR is smaller than a first threshold ratio CR1, the on-pixel weight provider 159 may increase the on-pixel weight Wopr as the on-pixel ratio OPR increases.

For example, when the on-pixel ratio OPR is greater than a second threshold ratio CR2, the on-pixel weight provider 159 may decrease the on-pixel weight Wopr as the on-pixel ratio OPR increases. The second threshold ratio CR2 may be greater than the first threshold ratio CR1.

For example, when the on-pixel ratio OPR is between the first threshold ratio CR1 and the second threshold ratio CR2, the on-pixel weight provider 159 may provide the on-pixel weight Wopr having a maximum value.

In accordance with the present embodiment, the effects in accordance with the embodiments shown in FIGS. 10 and 11 may be further emphasized.

Figure 19:
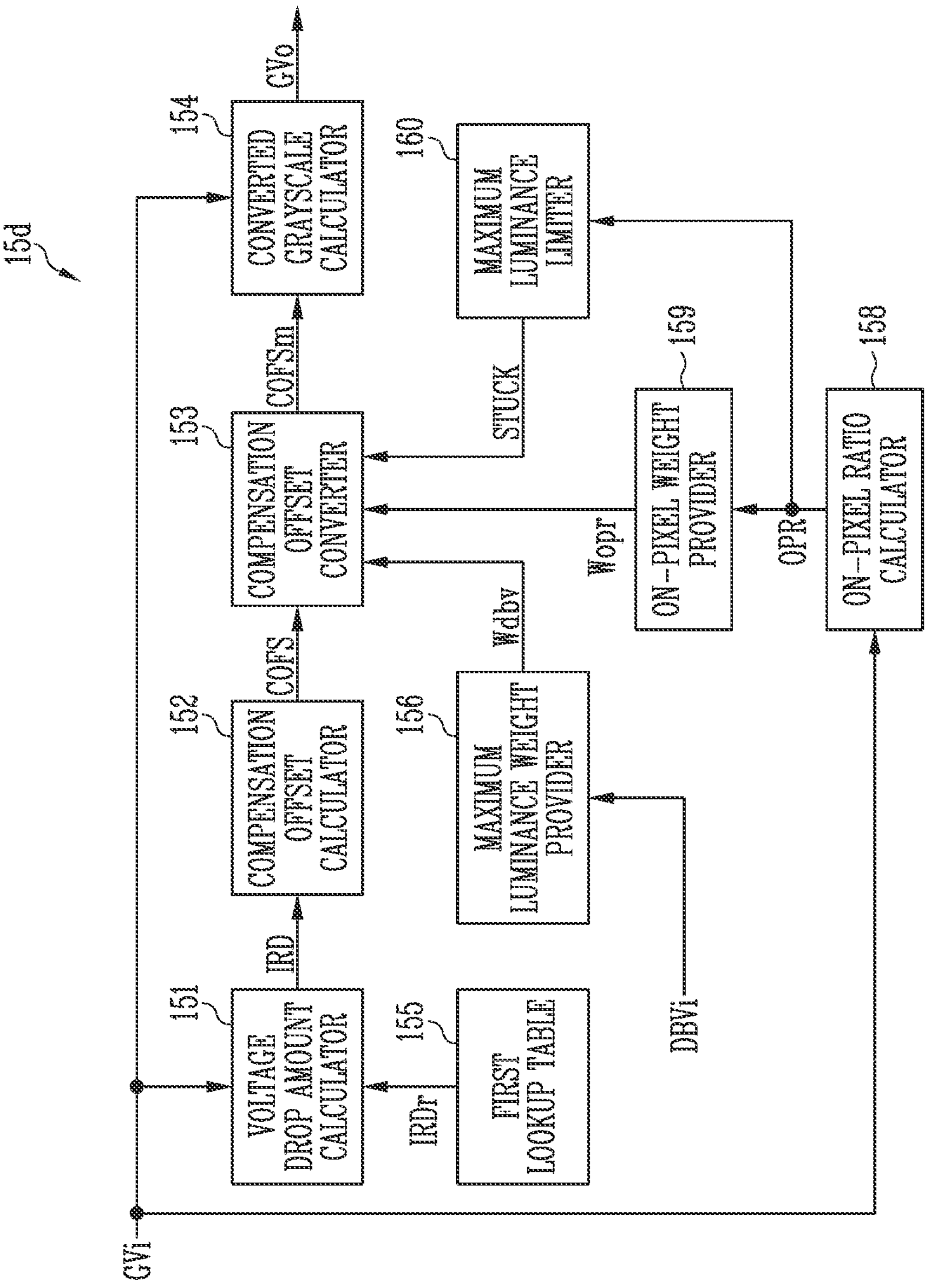
FIG. 19 is a diagram illustrating a grayscale converter in accordance with another embodiment of the present disclosure.

FIG. 19 is a diagram illustrating a grayscale converter in accordance with another embodiment of the present disclosure.

As compared with the grayscale converter **15*c* shown in FIG. 17, the grayscale converter 15*d* shown in FIG. 19 may further include a maximum luminance limiter 160**. Accordingly, the differences therebetween may be mainly described hereinafter, and redundant description of the same or substantially the same components thereof may not be repeated.

The maximum luminance limiter 160 may limit an increase in the second compensation offsets COFSm when the on-pixel ratio OPR decreases to a reference ratio or less. For example, when the on-pixel ratio OPR decreases to the reference ratio or less, the maximum luminance limiter 160 may provide a stuck signal STUCK to the compensation offset converter 153. When the compensation offset converter 153 receives the stuck signal STUCK, the compensation offset converter 153 may limit the second compensation offsets COFSm to a reference value or less.

In accordance with the present embodiment, a case where an excessively bright luminance is exhibited in an image having a low on-pixel ratio OPR may be prevented or reduced.

In the display device and the driving method thereof in accordance with one or more example embodiments of the present disclosure, display quality may be improved and power consumption may be reduced, while compensating for a voltage drop amount of a power voltage by using at least one of an input maximum luminance and/or an on-pixel ratio.

Although some example embodiments have been described, those skilled in the art will readily appreciate that various modifications are possible in the example embodiments without departing from the spirit and scope of the present disclosure. It will be understood that descriptions of features or aspects within each embodiment should typically be considered as available for other similar features or aspects in other embodiments, unless otherwise described. Thus, as would be apparent to one of ordinary skill in the art, features, characteristics, and/or elements described in connection with a particular embodiment may be used singly or in combination with features, characteristics, and/or elements described in connection with other embodiments unless otherwise specifically indicated. Therefore, it is to be understood that the foregoing is illustrative of various example embodiments and is not to be construed as limited to the specific example embodiments disclosed herein, and that various modifications to the disclosed example embodiments, as well as other example embodiments, are intended to be included within the spirit and scope of the present disclosure as defined in the appended claims, and their equivalents.

What is claimed is:

1. A display device comprising:

a plurality of pixels configured to display an image having an on-pixel ratio; and a user interface configured to manually set an input maximum luminance corresponding to a white grayscale value, wherein, when the input maximum luminance is set smaller than a first threshold value, at least a part of the image corresponding to the white grayscale value has a uniform maximum luminance, even when the on-pixel ratio is changed, and wherein, when the input maximum luminance is set greater than the first threshold value, at least a part of the image corresponding to the white grayscale value has various maximum luminances according to the on-pixel ratio.

2. A display device comprising:

a plurality of pixels configured to display an image having an on-pixel ratio;

a user interface configured to manually set an input maximum luminance; and a grayscale converter configured to:

calculate first compensation offsets based on positions of the pixels and input grayscales for the pixels;

convert the first compensation offsets into second compensation offsets according to a maximum luminance weight based on the input maximum luminance; and calculate converted grayscales by applying the second compensation offsets to the input grayscales, wherein, when the input maximum luminance is set smaller than a first threshold value, the image has a uniform maximum luminance, even when the on-pixel ratio is changed, and wherein, when the input maximum luminance is set greater than the first threshold value, the image has various maximum luminances according to the on-pixel ratio.

3. The display device of claim 2, wherein:

when the input maximum luminance is less than the first threshold value, the maximum luminance weight is increased as the input maximum luminance increases; and when the input maximum luminance is greater than the first threshold value, the maximum luminance weight is decreased as the input maximum luminance increases.

4. The display device of claim 3, wherein:

when the input maximum luminance is greater than the first threshold value and less than a second threshold value that is greater than the first threshold value, the maximum luminance weight corresponds to a positive number;

when the input maximum luminance corresponds to the second threshold value, the maximum luminance weight corresponds to 0; and when the input maximum luminance is greater than the second threshold value, the maximum luminance weight corresponds to a negative number.

5. The display device of claim 2, wherein the grayscale converter comprises:

a first lookup table comprising the positions of the pixels, and voltage drop amounts for reference grayscales for the pixels;

a voltage drop amount calculator configured to calculate voltage drop amounts of the input grayscales according to the first lookup table and the input grayscales; and a compensation offset calculator configured to calculate the first compensation offsets corresponding to the voltage drop amounts of the input grayscales.

6. The display device of claim 5, wherein the grayscale converter further comprises:

a maximum luminance weight provider configured to provide the maximum luminance weight corresponding to the input maximum luminance;

a compensation offset converter configured to provide the second compensation offsets by converting the first compensation offsets according to the maximum luminance weight; and a converted grayscale calculator configured to calculate the converted grayscales by applying the second compensation offsets to the input grayscales.

7. The display device of claim 6, wherein the grayscale converter further comprises a maximum luminance converter configured to provide the maximum luminance weight provider with a converted input maximum luminance that is converted based on the input grayscales and the input maximum luminance.

8. The display device of claim 7, wherein the maximum luminance converter comprises:

a target pattern detector configured to provide a pattern detection signal when the on-pixel ratio of the input grayscales is less than a reference ratio;

a target luminance detector configured to provide a luminance detection signal when the input maximum luminance is within a reference luminance range; and a maximum luminance mover configured to provide the converted input maximum luminance by converting the input maximum luminance, when the pattern detection signal and the luminance detection signal are received.

9. The display device of claim 8, wherein the maximum luminance mover is configured to provide the converted input maximum luminance by gradually increasing the input maximum luminance according to time.

10. The display device of claim 9, wherein the maximum luminance converter further comprises a frame counter configured to provide a count number by counting frames, and wherein the maximum luminance mover is configured to provide the converted input maximum luminance by gradually increasing the input maximum luminance according to the count number.

11. The display device of claim 6, wherein the grayscale converter further comprises an on-pixel weight provider configured to provide an on-pixel weight corresponding to the on-pixel ratio of the input grayscales, and wherein the compensation offset converter is configured to provide the second compensation offsets by converting the first compensation offsets according to the maximum luminance weight and the on-pixel weight.

12. The display device of claim 11, wherein, when the on-pixel ratio is less than a first threshold ratio, the on-pixel weight is increased as the on-pixel ratio increases.

13. The display device of claim 12, wherein, when the on-pixel ratio is greater than a second threshold ratio that is greater than the first threshold ratio, the on-pixel weight is decreased as the on-pixel ratio increases, and wherein, when the on-pixel ratio is between the first threshold ratio and the second threshold ratio, the on-pixel weight has a maximum value.

14. The display device of claim 11, wherein the grayscale converter further comprises an on-pixel ratio calculator configured to calculate the on-pixel ratio by applying a weight to average values of the input grayscales for each color.

15. The display device of claim 11, wherein the grayscale converter further comprises a maximum luminance limiter configured to limit an increase in the second compensation offsets, when the on-pixel ratio decreases to a reference ratio or less.

* * * * *